US009003194B2

(12) United States Patent
Ross

(10) Patent No.: US 9,003,194 B2
(45) Date of Patent: *Apr. 7, 2015

(54) SYSTEMS AND METHODS FOR DATA COMPRESSION AND DECOMPRESSION

(75) Inventor: Nathan Scott Ross, Miamisburg, OH (US)

(73) Assignee: Elsevier, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/283,255

(22) Filed: Oct. 27, 2011

(65) Prior Publication Data

US 2012/0041931 A1 Feb. 16, 2012

Related U.S. Application Data

(63) Continuation of application No. 11/122,157, filed on May 3, 2005.

(60) Provisional application No. 60/568,304, filed on May 4, 2004, provisional application No. 60/603,604, filed on Aug. 23, 2004.

(51) Int. Cl.
*H04L 9/32* (2006.01)
*G06F 21/64* (2013.01)

(52) U.S. Cl.
CPC .............. *H04L 9/3247* (2013.01); *G06F 21/64* (2013.01); *H04L 9/3239* (2013.01); *H04L 2209/20* (2013.01); *H04L 2209/30* (2013.01)

(58) Field of Classification Search
USPC ......................................................... 713/181
See application file for complete search history.

(56) References Cited

U.S. PATENT DOCUMENTS

| 5,032,987 | A | | 7/1991 | Broder et al. |
| 5,049,881 | A | * | 9/1991 | Gibson et al. ................... 341/95 |
| 5,371,499 | A | | 12/1994 | Graybill et al. |
| 6,657,562 | B2 | * | 12/2003 | Radermacher et al. ......... 341/50 |
| 6,728,711 | B2 | * | 4/2004 | Richard ................................ 1/1 |
| 2002/0191791 | A1 | | 12/2002 | Anand |
| 2003/0001873 | A1 | | 1/2003 | Garfield et al. |
| 2003/0162541 | A1 | * | 8/2003 | Schwarzbauer et al. ...... 455/432 |

(Continued)

FOREIGN PATENT DOCUMENTS

| EP | 1041767 A3 | 5/2002 |
| WO | WO 02/91155 | 11/2002 |

OTHER PUBLICATIONS

Henson V.: An Analysis of Compare-by-Hash, 9th Workshop on Hot Topics in Operating Systems. May 2003.

(Continued)

*Primary Examiner* — Kambiz Zand
*Assistant Examiner* — Stephen Sanders
(74) *Attorney, Agent, or Firm* — Dinsmore & Shohl LLP

(57) ABSTRACT

By way of example only, in various embodiments, the present system and system is designed to reduce the size of data on a computer through compression, to improve hash, message digest, and checksum technology and their application to information and data storage, to improve uniqueness by using mutual exclusion in hash and checksum tests, to improve checksum tests providing better computer security, to create an XML compression format and to move binary compression formats to XML or other markup language, to utilize variable length hashes and message digests, and to create an XML based checksum that can be used to verify the integrity of files.

18 Claims, 4 Drawing Sheets

(56) References Cited

U.S. PATENT DOCUMENTS

| | | | |
|---|---|---|---|
| 2004/0013307 A1* | 1/2004 | Thienot et al. | 382/232 |
| 2004/0015600 A1* | 1/2004 | Tiwary et al. | 709/234 |
| 2004/0017913 A1 | 1/2004 | Hawkes | |
| 2004/0181561 A1 | 9/2004 | Knox et al. | |
| 2005/0074116 A1 | 4/2005 | Hall | |

OTHER PUBLICATIONS

De Groot S P et al: "Applying the User-Centered Design (UCD) process to the development of a large bibliographic navigation tool: a partnership between librarian, researcher and developer.". Internet Publications [Online], Jun. 16, 2004, http://www.elsevier.com/framework+librarians/WhitePapers/White_Paper_1_Usability_Testing.pdf; see section "use of citations" and abstract.

Garfield Eugene: "Citation Analysis as a Tool in Journal Evaluation", Essays of an Informed Scientist, [Online] vol. 1, 1972, pp. 527-544, available at http://cybermetrics.cindoc.csic.es/cybermetrics/pdf/569.pdf.

Hitchcock S et al: "Evaluating Citebase, an open access Web-based citation-ranked search and impact discovery service" Internet Publication—Technical Report, [Online] Jul. 2003, University of Southhampton, available at http://opcit.eprints.org/evaluation/Citebase-evaluation/evaluation-report-tr.pdf; see abstract, section 2.2, section 7.2, section 4 and figure 4.1.

Lawrence S et al: "Digital Libraries and Autonomous Citation Indexing", Computer, IEEE Service Center, Los Alamitos, CA, vol. 32, No. 6, Jun. 1999, pp. 67-71, ISSN: 0018-9162; see section "Querying and Browsing" and figure 2.

Mark Logic Corp: "Mark Logic Content Interaction Server—Developer's Guide", Internet Publication [Online], Oct. 7, 2004, available at: http://xqzone.marklogic.com/pubs/2.2/books/dev_guide.pdf; see section 9.0 and section 11.0.

Smit E: "Evidence-based Development of e-products" Internet Publication [Online], Oct. 18, 2004, available at http://www.infonortics.com/chemical/ch04/slides/smit-2.pdf.

* cited by examiner

SYSTEMS AND METHODS FOR DATA COMPRESSION AND DECOMPRESSION

CROSS-REFERENCE TO RELATED APPLICATIONS

This application is a continuation of U.S. application Ser. No. 11/122,157, filed May 3, 2005, and claims the benefit of U.S. Provisional Application No. 60/568,304, filed May 4, 2004 and U.S. Provisional Application No. 60/603,604, filed Aug. 23, 2004. The entire contents of the above applications are incorporated herein by reference.

BACKGROUND

Prior art discloses several branches of compression algorithms. Statistical methods of compression relied on reducing the size of frequent patterns in data. Compression was based on redundancy of the data and often involved the work of Shannon and others. There were practical limits to compressing data with redundancy.

Prior art compression is statistical. Compression is based on redundancy modeling. The present invention allows checksums to be used to determine whether a number in a sequence of numbers matches a given checksum and to make files smaller. Currently, files are limited by the amount of redundancy that can be removed. A checksum compressor would operate on how unique a number is by the uniqueness of the checksum—i.e., there is only one checksum number that can be associated with a given number.

Message digests were created to verify that data is the original data and that no changes occurred in transmission. They can be used to ensure that computer files have not been modified. There are two main message digests and signature hashes used today, Secure Hash Algorithm ("SHA") and Message Digest Algorithm No. 5 ("MD5"). MD5 is one of the first message digest algorithms[1] created and was developed by Rivest-Shamir-Adleman ("RSA"). As is known in the art, MD5 has a problem with collisions, and is not guaranteed to be as unique as SHA.

[1] Other message digest algorithms include MD2 (a message-digest hash function optimized for 8-bit machines), and MD4 (a message-digest hash function optimized for 32-bit machines).

SHA was developed by the U.S. government (N.S.A) to fingerprint computer data. The government developed SHA as a means of verifying digital information. SHA is a quest for generating a unique key or hash for a given set of data. One of the primary government interests is in tracking data and transmission of data. There are numerous open source implementations of the SHA algorithm in C and C++ code.

This is a note from the US government about SHA security, however, it should not be considered the assertion of the US government.

This document specifies a Secure Hash Algorithm, SHA-1, for computing a condensed representation of a message or a data file. When a message of any length<2^64 bits is input, the SHA-1 produces a 160-bit output called a message digest. The message digest can then, for example, be input to a signature algorithm which generates or verifies the signature for the message. Signing the message digest rather than the message often improves the efficiency of the process because the message digest is usually much smaller in size than the message. The same hash algorithm must be used by the verifier of a digital signature as was used by the creator of the digital signature. Any change to the message in transit will, with very high probability, result in a different message digest, and the signature will fail to verify.

The SHA-1 is called secure because it is computationally infeasible to find a message which corresponds to a given message digest, or to find two different messages which produce the same message digest. Any change to a message in transit will, with very high probability, result in a different message digest, and the signature will fail to verify.

Both SHA and MD5 are known in the art, and further description is not provided herein.

SUMMARY

The quest for uniqueness of data through message digests can also be used to improve compression. How unique a number is can be used to compress it. A checksum can be unique or relatively unique with collisions. A unique checksum would generate a unique output number for each input. A relatively unique checksum would generate numbers that are the same for different inputs or it would minimize collisions between inputs.

In one embodiment, the present system and method is designed to reduce the size of data on a computer through compression. In another embodiment, the present system and method is designed to improve hash, message digest, and checksum technology and their application to information and data storage. In another embodiment, the present system and method is designed to improve uniqueness by using mutual exclusion in hash and checksum tests. In another embodiment, the present system and method is designed to improve checksum tests providing better computer security. In another embodiment, the present system and method is designed to create an XML compression format and to move binary compression formats to XML or other markup language. In another embodiment, the present system and method is designed to utilize variable length hashes and message digests. In another embodiment, the present system and method is designed to create an XML based checksum that can be used to verify the integrity of files.

In addition to the various embodiments discussed herein, the present system and method can also be adapted for encryption and verification uses, improved validation and checksums to ensure that a file is unchanged or unmodified, to increase the bandwidths of data transfers, (e.g., ftp and streaming media), and to replace other data compression methods (e.g., mpeg).

Further advantages of the present system and method include increased compression capacity with open formats, decreased file sizes, using document type definitions (DTDs) to validate compressed files, using XML or other markup language to describe compressed files, and using checksum tests. Such tests can be used to compress numbers or data, and to validate a file's integrity. Checksum tests can also be used to verify the integrity of a file through a combination of digital signatures, moduluses, or checksums. In combination, they can also be used to compress files if the resulting signature checksum is less than the size of a block of bytes and has few or no collisions. As known in the art, verifying file integrity means ensuring that the contents haven't changed. In one embodiment, the present system and method also provides for multiple ways to verify file integrity. Checksums can compress numbers, and by using multiple checksums, file security and integrity can be implemented with stronger sets of checks.

Checksum compression can be used to reduce the size of data, and it could be commercialized as an alternative to zip and archive compression formats. It would allow for improved streaming media and audio and video files by increasing the quality to bandwidth or size ratio. Further, there are many open source message digest programs which increase its application. Checksum compression can also reduce storage costs and improve productivity and efficiency.

In an aspect, the present invention is directed to a system for data storage comprising one or more processors operable to generate a first checksum value for a data block and a second checksum value for the data block, wherein said first checksum value is generated by applying a first checksum algorithm to said data block and said second checksum value is generated by applying a second checksum algorithm, different from said first checksum algorithm, to said data block; one or more processors operable to create a data entry comprising data identifying: the first and second checksum values, the first and second checksum algorithms, and at least one of the identified attributes of the data block; and one or more processors operable to store said data entry in a computer-readable medium.

In various embodiments, the one or more processors operable to generate, the one or more processors operable to create, and the one or more processors operable to store may or may not be distinct. For example, one processor can be operable to generate, create, and store. Alternatively, a plurality of processors can be operable to generate, create, and/or store.

In an aspect, the present invention is directed to a system for data storage comprising one or more processors operable to identify one or more attributes of a first data block and a second data block, said second data block comprising and different from said first data block; one or more processors operable to generate a first checksum value for the first data block, wherein said first checksum value is generated by applying a first checksum algorithm to said first data block; one or more processors operable to generate a second checksum value for the second data block, wherein said second checksum value is generated by applying a second checksum algorithm to said second data block, one or more processors operable to create a data entry comprising data identifying the first and second checksum values, and at least one of the identified attributes of the first and second data blocks; and one or more processors operable to store said data entry in a computer-readable medium.

In various embodiments, the one or more processors operable to identify, the one or more processors operable to generate a first checksum value, the one or more processors operable to generate a second checksum value, the one or more processors operable create, and the one or more processors operable to store may or may not be distinct. For example, one processor can be operable to identify, generate a first checksum value, generate a second checksum value, create, and store. Alternatively, a plurality of processors can be operable to identify, generate a first checksum value, generate a second checksum value, create, and/or store.

In an aspect of the present invention the system further comprises one or more processors further operable to determine an attribute for the data block, said attribute being one of a name, size, length, hash type, checksum type, digest type, padding, floor, ceiling, modulus, collision, directory, root, drive, path, date, time, modified date, permission, owner, or byte order; one or more processors operable to create a data entry comprising the attribute; one or more processors operable to store said data entry in a computer-readable medium.

In various embodiments, the one or more processors operable to determine, the one or more processors operable to create, and the one or more processors operable to store may or may not be distinct. For example, one processor can be operable to determine, create, and store. Alternatively, a plurality of processors can be operable to determine, create, and/or store.

In various aspects of the present invention the second checksum algorithm is the first checksum algorithm; the attributes are one of a name, size, length, hash type, checksum type, digest type, padding, floor, ceiling, modulus, collision, directory, root, drive, path, date, time, modified date, permission, owner, or byte order; the data entry is written in a markup language; the markup language is one of either XML or SGML; the one or more checksum values is at least one of a hashed value, a digest, and a checksum number; the one or more checksum values is generated using at least one of an MD2 algorithm, an MD4 algorithm, an MD5 algorithm, an SHA algorithm, a Cyclic Redundant Checksum algorithm, a Ripe algorithm, a CRC16 checksum algorithm, a CRC32 checksum algorithm, and a CRC64 checksum algorithm; and at least 2 of said one or more processors operates in parallel.

In an aspect, the present invention is directed to a system for data recovery comprising one or more processors operable to receive a data entry comprising data identifying first and second checksum values, first and second checksum algorithms, and at least one attribute of a first data block; and based on said data entry; one or more processors operable to operable to identify said first data block by (a) applying said first checksum algorithm to each block in a first set of data blocks to generate a first set of checksum values, each value in said first set of checksum values corresponding to one or more data blocks in said first set of data blocks, (b) comparing said first set of checksum values to said first checksum value, (c) identifying one or more first candidate data blocks as potentially being said first data block.

In various embodiments, the one or more processors operable to receive and the one or more processors operable to identify may or may not be distinct. For example, one processor can be operable to receive and identify. Alternatively, a plurality of processors can be operable to receive and/or identify.

In an aspect of the present invention, the system further comprises one or more processors operable to identify one or more first candidate data blocks as corresponding to values in said first set of checksum values that are equal to said first checksum value.

In an aspect of the present invention, the system further comprises one or more processors operable to generate a second set of checksum values by applying said second checksum algorithm to said first candidate data blocks; one or more processors operable to compare said second set of checksum values to said second checksum value; one or more processors operable to identify a second set of candidate data blocks as corresponding to values in said second set of checksum values equal to said second checksum value; and one or more processors operable to identify all data blocks in said second set of candidate data blocks as potentially being said first data block.

In various embodiments, the one or more processors operable to generate, the one or more processors operable to compare, the one or more processors operable to identify a second set of candidate blocks, and the one or more processors operable to identify all data blocks may or may not be distinct. For example, one processor can be operable to generate, compare, identify a second set of candidate blocks, and identify all data blocks. Alternatively, a plurality of processors can be operable to generate, compare, identify a second set of candidate blocks, and/or identify all data blocks.

In various aspects of the present invention, the first checksum algorithm is applied to selected data blocks in the first set of data blocks through one of at least a linear scan or nonlinear scan; the nonlinear scan comprises one of a skipping scan, a modulus scan, or an exponential scan; each candidate data block is assigned a unique collision number; and at least one of the one or more processors comprises an integer calculation unit and one or more hash registers.

In an aspect, the present invention is directed to a system for data storage comprising computer implemented means for generating a first checksum value for a first data block and a second checksum value for the first data block; computer implemented means for creating a data entry comprising the first and second checksum values; and computer implemented means for storing said data entry in a computer-readable medium.

In various embodiments, the means for generating, means for creating, and means for storing may or may not be distinct. For example, one means can generate, create, and store. Alternatively, a plurality of means generate, create, and/or store.

In an aspect, the present invention is directed to a system for data storage comprising computer implemented means for identifying one or more attributes of a data block; computer implemented means for generating a first checksum value for the data block and a second checksum value for the data block, wherein said first checksum value is generated by applying a first checksum algorithm to said data block and said second checksum value is generated by applying a second checksum algorithm, different from said first checksum algorithm, to said data block; computer implemented means for creating a data entry comprising data identifying: the first and second checksum values, the first and second checksum algorithms, and at least one of the identified attributes of the data block; and computer implemented means for storing said data entry in a computer-readable medium.

In various embodiments, the means for identifying, means for generating, means for creating, and means for storing may or may not be distinct. For example, one means can identify, generate, create, and store. Alternatively, a plurality of means identify, generate, create, and/or store.

In an aspect, the present invention is directed to a system for data recovery comprising computer implemented means for identifying one or more attributes of a first data block and a second data block, said second data block comprising and different from said first data block; computer implemented means for generating a first checksum value for the first data block, wherein said first checksum value is generated by applying a first checksum algorithm to said first data block; computer implemented means for generating a second checksum value for the second data block, wherein said second checksum value is generated by applying a second checksum algorithm to said second data block, computer implemented means for creating a data entry comprising data identifying: the first and second checksum values, and at least one of the identified attributes of the first and second data blocks; and computer implemented means for storing said data entry in a computer-readable medium.

In various embodiments, the means for identifying, means for generating a first checksum value, means for generating a second checksum value, means for creating, and means for storing may or may not be distinct. For example, one means can identify, generate a first checksum value, generate a second checksum value, create, and store. Alternatively, a plurality of means identify, generate a first checksum value, generate a second checksum value, create, and store.

FIGURES

DETAILED DESCRIPTION

A checksum is a calculated representation of another number. There are many types of checksums, including but not limited to, message digests, hashes, digital signatures, cyclic redundancy checksum ("CRC"), and numerical checks. A checksum may comprise a group of hashes, signatures, digests, or other test that can fingerprint uniquely or relatively uniquely a number. In this way a checksum may be more powerful than a hash, signature, etc., alone.

In one embodiment, a checksum test (validation) can be performed on a selected number to verify if the number a checksum identical to an original number's checksum. As will be recognized, a number may be a subset of a larger number, whereby the checksum is validated against a subset of the original number. Further, subsets may be combined to form additional checksums, thereby adding an additional level of validation for the underlying number. For example, a large number may be divided into 16 equal parts, each having a checksum. Additionally, each adjacent pair of numbers (8 pairs) can have their own checksum, and each half of the master set can also have a checksum.

A checksum may be created to represent any data item or combination of data items. For example, checksums may be created representing the contents of a file or the name of a file. Further, a checksum may be created for the file name, its contents, and a digital signature for the file. As will be recognized, a checksum may be based on any numerical representation of data, including but not limited to file name, file size, file date, file length, a file hash or digest, etc. For ease of discussion, the terms data, data item, and data block may encompass any combination of data, including by way of example only, single data items, combined data items, single or combined files, file names, descriptors, metadata, blocks of data, etc.

A digital file can be represented as a series of numbers. In a preferred embodiment, by utilizing a checksum, a data in the form of a digital file can be compressed. In another embodiment, a message digest, hash, or digital signature may be utilized in conjunction with the checksum. As will be recognized, the present systems and methods can be applied to any file types, including binary files. In addition, a binary format could be used to describe, as well as encode, a compressed file. As will be further recognized, increasing computing power can provide better compression and more thorough testing.

Compression

Figure 1:
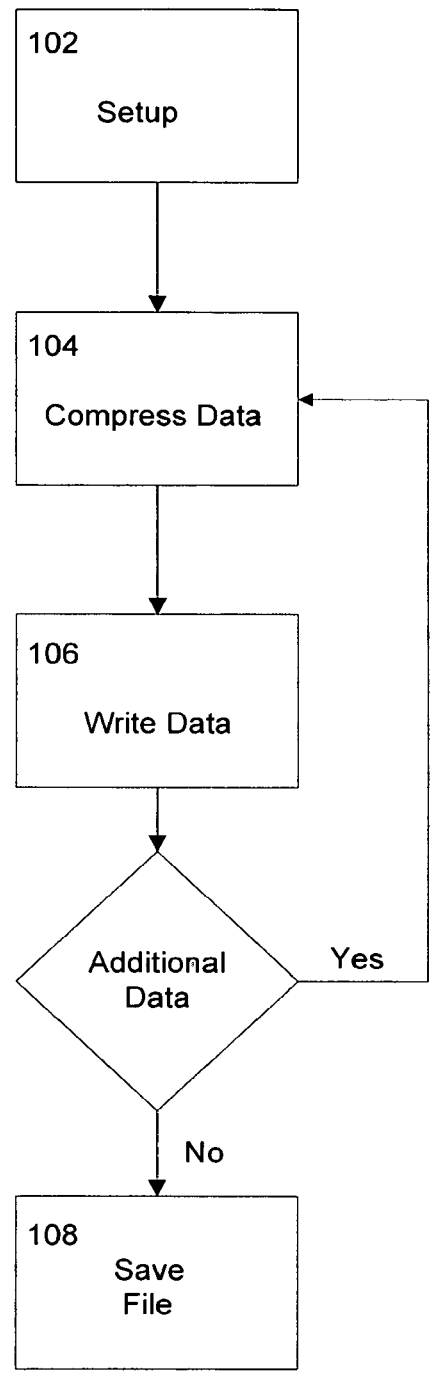
FIG. 1 is a flow chart illustrating the compression steps of the present systems and methods.

One embodiment of data compression is shown in connection with FIG. 1. In this embodiment, data is compressed by running a compression program on the data. Details of the compression are illustrated in connection with FIG. 1. As shown in FIG. 1, in step 102, a data file that will contain the compressed file data is established. This step may also included determining file attributes such as file size, length, name, block sizes, number of blocks, compression methods to be used, etc.

In step 104, data is compressed using the desired compression methods. For example, data may be compressed by generating its SHA digest, MD5 digest, CRC, or any other digest, digital signature, checksum, or hashing method. By way of non-limiting example only, other digital signatures and checksums can include MD2, MD4, MD5, Ripe, SHA family, CRC16 CRC32, and CRC64. Data can also be compressed by a Modulus, Modulus Remainder and Modulus Exponent, described below. In one embodiment, compression can be reversible. In another embodiment, compression can be non-reversible. Providing a combination of signatures and checksums and moduluses allows for the signature to be reversible.

In one embodiment, data may be divided into blocks of any size before compression. As will be recognized, when using fixed length hashing, digests, or checksums, the larger the blocks the better the compression ratio. As will also be recognized, collisions may occur, and accordingly a collision counter may be implemented. Such counters are described in detail below. The result of a compression method is referred to herein as the checksum value.

In step 106, data is written to the data file, or may be stored in temporary or permanent computer memory (i.e., volatile or non-volatile memory). Such data includes the compressed data in step 104. In one embodiment, the data file also contains all of the related details of the data. Such details may include, by way of example only, the file name, the original file size, block categories, block size, block identifiers, block entries, padding used for any blocks, checksum numbers, etc. Each block category may be identified by a unique block identifier. Further, each block category may contain one or more block entries, padding entries, block size entries, block length entries, etc. Each block entry typically contains one hash, digest, checksum, reverse hash, or other entry, as created by the checksum generator. As discussed in detail below, such entries are used when validating the data, i.e., the block entry checksum value is compared to another number's checksum value. In one embodiment multiple block entries for the same data (using different compression methods) may be used for mutual exclusion.

As will be recognized, and as described in detail below, the data file may be written in XML, SGML, or another markup language. For example, where SHA is used to compress a data block, an XML entry may contain the checksum value delimited by SHA identifiers, e.g., "<SHA> checksum value </SHA>". An example of such a markup file is below.

If no other data is to be compressed, the data file is saved, and compression is complete (step 108), otherwise flow continues to step 104.

One embodiment of the present system and method comprises markup based checksum compression with attributes as an alternative to binary compression formats. The markup tags can be of variable length and can be shortened, i.e., the tags can be numbered to decrease length (e.g., "<1></1><2></2>"). As will be recognized, using markup tags is clearer than a binary compression format. The file can also be converted openly.

As will be recognized by those skilled in the art, to be converted openly means there is an open format for XML or a non-XML text markup grammar definition for file signatures. Further, there may be a computer program and utility (such as the Perl program included in appendix A) for generating those file signatures according to a predefined grammar and verifying them according to Document Type Definitions (DTDs) if the signature file is XML, SGML, Backus-Naur, or any other grammar Additionally, a file utility may have optional arguments that can exclude or modify the file signature output given command options. Also, it may mean that the XML format for any text markup allows for groups of checksums to be applied together and for checksum operations to be specifically defined in the DTD or grammar definition. A text format is openly described, viewable, agreed upon, extendable, and verifiable. In addition checksum operations can be defined and agreed upon in an open consistent format. A binary format is less open by being in a non-text format that is not always readable by ordinary text editors. A binary file signature format that is openly defined can also be used for signatures but is much less open, resulting in data not being locked in a proprietary compression binary. Further, this provides a means to utilize the principle of mutual exclusion, whereby SHA and MD5 (other any number of hashing algorithms) can be used to check each other.

As discussed above, data can be compressed using any mechanism, e.g., a hashing mechanism. In one embodiment, data may be divided into any number of blocks and each block can be hashed. For example, data of size 1000 bytes can be divided into four 250 byte blocks, whereby each block can be hashed. As will be recognized, data can be divided into a series of blocks n bytes long with padding or without padding. For example, before compression, data of size 992 bytes can be divided into four 250 byte blocks, each with 2 padding bytes.

In one embodiment, each block can be hashed using more than one hashing mechanism. Additionally, two or more blocks may be hashed independently to create two respective checksum values, as well as together to create a composite (third) checksum value. In one embodiment, these multiple checksum values may be used for mutual exclusion, described in detail below. Briefly, however, mutual exclusion provides a mechanism to increase the probability that a validated number is the correct number. For example, where a first block is validated (e.g., by locating a sequence of numbers having the same MD5 or SHA hash), an additional digest, hash value, or checksum may be validated to ensure that the sequence of numbers is the correct sequence. With mutual exclusion there is a decreased chance of more than one collision, i.e., it is statistically improbable that multiple hashes for the same sequence of numbers will all result in collisions. As will be recognized, any number of digests, hash values or checksums can be used to further increase reliability. In one embodiment, a number can also be processed through a checksum in reverse or be run through a variable length checksum which generates a variable length key from 30 to 50 bytes. As will be recognized, SHA and MD5 are fixed byte length hash algorithms, with SHA would have a longer signature key than MD5.

An exemplary compression markup file is below:

```
<filename>Heracleon.doc</filename>
    <block no="1">
        <blocksize>2000</blocksize>
        <blocklength>1233</blocklength>
    </padded>
            <md5>42dcd3c7 6f0e69e8 614b999b d1f2acdc 8de47d88</md5>
            <sha>a9993e36 4706816a ba3e2571 7850c26c 9cd0d89d</sha>
            <crc>129837129</crc>
    </block no="1">
    <block no="2">
```

```
            <blocksize>2000</blocksize>
            <blocklength>133</blocklength>
            </padded>
                    <md5>a9993e364706816aba3e25717850c26c9cd0d89d</md5>
                    <sha> 2d795c01 ff54cfd1 ba6771c5 99c1ac64 baf1acc7</sha>
                    <crc>129837129</crc>
        </block no="2">
        <block no="3">
            <blocksize>2000</blocksize>
            <blocklength>133</blocklength>
            </padded>
                    <md5>a9993e364706816aba3e25717850c26c9cd0d89d</md5>
                    <sha> 2d795c01 ff54cfd1 ba6771c5 99c1ac64 baf1acc7</sha>
                <crc>129837129</crc>
        </block no="3">
</file>
```

As a further example, suppose a file named "file" is compressed as "file.archive". The size of "file" is determined to be 120,233 bytes. It may be desired that data be divided into blocks. Where a block size is defined as 20000 bytes, "file" could be divided into 7 blocks, with the last block having only 233 bytes. Each block may be run through a checksum generator and a checksum block entry is written for each compression method used on the block. For example, where block number 2 is compressed using SHA and MD5, a block entry for each would be included in the block category for block number 2. Other entries may be listed in this block category, such as the referenced block number (here "2"), block size (here 2000 bytes), block length, padding, etc. All blocks can be saved to "file.archive" that may have a file size of only 2,156 bytes. An example of the file "file.archive" is below.

```
<filename>file</filename>
    <block no="1">
                <blocksize>20000</blocksize>
                <blockl<length>20000</blocklength>
                </padded>
                        <sha-reverse>42ded03c7 6f2e59e8 614b999b d1123333 8de47d83</sha-reverse>
                        <sha>a1111e36 4706816a ba3e2571 7850c26c 9cd0d89d</sha>
                        <crc>12983712900000</crc>
    </block no="1">
    <block no="2">
                <blocksize>20000</blocksize>
                <blocklength>20000</blocklength>
                </padded>
                        <sha-reverse>a9b00e364706816aba3e25717850c26c9cd0d89d</sha-reverse>
                        <sha> 2d700c01 ff54cfd1 ba5771c5 99c1ac64 baf1acc7</sha>
                        <crc>129837129213123321</crc>
    </block no="2">
    <block no="3">
            <blocksize>20000</blocksize>
            <blocklength>20000</blocklength>
            </padded>
                        <sha-reverse>a92222e364705816aba3e25717850c26c9cd0d89d</sha-reverse>
                        <sha> 2d795c01 ff54cfd1 ba6771c5 99c1ac64 baf1acc7</sha>
                        <crc>129837129</crc>
    </block no="3">
    <block no="4">
            <blocksize>20000</blocksize>
            <blocklength>20000</blocklength>
            </padded>
                        <sha-reverse>a99233e364706816aba3e25717850c26c9cd0d89d</md5>
                        <sha> 2deffc01 ffaaaad1 ba6771c5 99c1ac64 baf1acc7</sha>
                        <crc>102839203342234</crc>
    </block no="4">
    <block no="5">
            <blocksize>20000</blocksize>
            <blocklength>20000</blocklength>
            </padded>
                        <sha-reverse>a8883e364706816aba3e76555850c26c9cd0d89d</sha-reverse>
                        <sha> 2d795c01 ffffff ba6771c5 99c1ac64 baf1acc7</sha>
                        <crc>1298371291233</crc>
    </block no="5">
    <block no="6">
            <blocksize>20000</blocksize>
            <blocklength>20000</blocklength>
            </padded>
                        <sha-reverse>eeeeee364706816aba3e25717850c26c9cd0d89d</sha-reverse>
                        <sha> 2d00Fc01 ffeeeed1 ba6771c5 99c1ac64 baf1acc7</sha>
                        <crc>12982344129</crc>
```

```
    </block no="6">
    <block no="7">
        <blocksize>20000</blocksize>
        <blocklength>293</blocklength>
        </padded>
                <sha-reverse>22222e364706816aba3e25717850c26c9cd0d89d</sha-reverse>
                <sha> 00000c01 ff54cfd1 ba6771c5 99c1ac64 bafl acc7</sha>
                <crc>129833129</crc>
    </block no="7">
    </file>
```

Reconstruction

In a preferred embodiment, archived data is reconstructed by running a reconstruction program on the archived data. Details of the validation are illustrated in connection with FIG. 2.

In step 202, a compressed file is opened. This may be an archive file, or as described above, an XML, SGML, or other file with compressed file descriptors. File descriptors can include the file name, the original file size, block categories, block size, block identifiers, block entries, padding used for any blocks, checksum numbers, block identifier, one or more block entries, padding entries, block size entries, block length entries, etc. Each block entry may contain one or more of a hash, digest, checksum, reverse hash, or other entry, as created by the checksum generator. Further, the file descriptor may also contain file metadata or data attributes. By way of non-limiting example only, data attributes can be at least one of a size, length, filename, directory, root, drive, path, date, time, modified date, permission, owner, byte order, and type or other properties and metadata. Each of the files attributes can be included in the archive signature for that file.

In step 204, a scan is performed on a range of numbers. The scanning process is a method of finding a number that generates a checksum value matching a known checksum, in particular, examining each number in a range of numbers to find a block of data resulting in the same checksum value as a particular block entry. In various embodiments, different scanning methods may be used including, by way of example only, linear scans, non-linear scans, skipping scans, exponential scans, restrictive scans, modulus scans, etc. As will be recognized, different scanning methods may improve scan times by reducing the set of numbers in the scan range. As will be further recognized, non-scanning methods may also be used in connection with scanning to simplify the scanning process. For example, determining if a number is prime, composite, even, or odd may be used as a step in the validation process. Various scanning methods are discussed in detail below.

In one embodiment, each number in the scan range is verified against a known checksum. In another embodiment, each number in the scan range is verified against a known checksum, and where the verification is a success, the number is verified against one or more subsequent checksums (as described in connection with mutual exclusion). In another embodiment, each number in the scan range is verified against all known checksums.

In various embodiments, nonlinear or skipping scans may used during scanning Nonlinear or skipping scans are scans that that can be out of sequential order or may skip numbers, e.g., skipping or nonlinear scans could skip every odd number, every even number, every 5th number, or scan randomly. Additional embodiments include other scanning methods, including a permutation scan (i.e., a checksum scan that can run against a series of permutations), a parallel scan (i.e., a checksum scan that can divide the scanned range between multiple computers, microprocessors, processes, etc.), a restriction scan (i.e., a scan that can be run against a sequence of numbers, e.g., from 0 to N, or from M to N). With a restriction scan, a floor or ceiling may be defined such that the scanning is only performed on numbers between the floor and ceiling. These and other scanning embodiments are discussed in detail below.

For example, an input O(Input) may have a checksum output N. In order for a number M(hashed) to be equal to the O(Input) it must equal its checksum output(2). So N=N2 for O=M. This aspect of scanning may be expressed by the following formula:

$$O(\text{Input}) = \text{Checksum Output}(N)$$

$$M(\text{hashed}) = \text{Checksum Output}(N2)$$

In one embodiment, a linear scan is used. This is the most basic scan, where a range of numbers, e.g., from 1 to n, is scanned incrementally. Reverse scans, from n to 1, may also be used. Other scanning methods are described below.

In a preferred embodiment, a checksum can be used to find a number that is associated with the digital signature, message digest, checksum, hash, etc. of a known number. Any scanning method may be implemented to validate the checksum. For example, in a linear scan, a number is incremented and tested to see if it matches the known checksum. If it does not match, the number is again incremented and tested. These steps are repeated until the checksum is either found or a maximum number has been reached. As will be recognized, other scanning methods, as mentioned both above and below, may be utilized to validate checksums.

In one embodiment a parallel scan is used. An illustrative example of a parallel scan follows. A scan range exists from 0 to 10029000. The scan range can divided between 2 or more processors and each processor is assigned a corresponding fraction of that range. Here, 4 processors each are allocated ¼ of the range. 10029000 is divided into 4 parts and each CPU runs the checks to determine if one number outputs the same checksums. If the number generates an identical checksum, computer processing ends. Note that additional processing may take place where mutual exclusion is incorporated. Mutual exclusion is described in greater detail below. For example, if number 12333 generates the correct MD5 hash, then the number has potentially been found. Mutual exclusion verification provides assurance that the number is correct, e.g., where the number also generates the correct CRC and SHA, there is a greater likelihood that the number is correct. A pair of digital signatures can also be created which may have collisions but are designed to produce different signature results when used together. This is an example of mutual exclusion. For example digital signature xyz can be designed to produce a different signature than digital signature zzz.

The following illustrates a parallel scan.

| CPU1 | CPU2 | CPU3 | CPU4 |
|---|---|---|---|
| 0-2507250 | 2507251-50145499 | 5014500-72521750 | 72521751-10039000 |

Located Number 12333:
CPU 1 Checksum Result:

MD5: 42dcd3c7 6f0e69e8 614b999b d1f2acdc 8de47d88
SHA: 42dcd3c7 6f0e69e8 614b999b d1f2acdc 8de47d88 1231231
CRC: 123213231213
Result: Number 12333 matches the original checksums
Original Checksum:

MD5: 42dcd3c7 6f0e69e8 614b999b d1f2acdc 8de47d88
SHA: 42dcd3c7 6f0e69e8 614b999b d1f2acdc 8de47d88 1231231
CRC: 123213231213

In one embodiment, there may be collisions outside a particular range of numbers, and accordingly, a scan could iterate through a defined range to find a number X that is associated with a checksum Y. This is often called a restriction scan. A restriction scan can define a starting point as well as an ending point for a scan, e.g., from 12 to 123. Another example of a restriction scan can be a collar, such that a number N to the $x^{th}$ power acts as a starting point with a number M to the $y^{th}$ power as an ending point.

In another embodiment, a skipping scan can be used to reduce the number of iterations in a scan. Such a skipping scan can skip numbers during the scanning process. For example, the scan could skip odd or even numbers, every $n^{th}$ number, or a defined skipping set, and perform checksums on the relevant numbers.

In another embodiment, a modulus scan can be used. A modulus scan is described in detail below.

In another embodiment, and as mentioned above, mutual exclusion may be used to increase the speed of the validation, as well as to ensure the uniqueness of the data. As will be recognized, message digest, hashes, and digital signatures are similar to checksums in that they provide an alternate method to represent a known data item. In the present system and method, multiple checksums, signatures, hashes, digests, etc., can be used to validate a known checksum based on the principle of mutual exclusion In one embodiment, mutual exclusion is the result of pairing two or more signatures or checksums so that the signatures and signature results validate other signatures and signature results against collisions. For one digital signature or hash or checksum there can be a collision, but two checksums can produce different results and thereby increasing the probability that the correct number has been found. Digital signatures can also be created that produce different results for different inputs and minimize collisions.

By providing more than one mathematical representation of a known data item, file, block, etc., mutual exclusion ensures that there is a higher statistical probability of uniqueness when validating the data through scanning Where a collision occurs for one message digest, it is unlikely to also be a collision for a second digest. Further, two digests can be used to generate a different and distinct key for a given input. As will be recognized, based on the principle of mutual exclusion, 2 or more checksums using different checksum methods can be used to verify that a checksum number validates against the original number. With 3, 4, or more checksums, each using a different checksum method, it is even more unlikely that collisions will occur in all of the digests.

For example, the following inputs generate the same MD5 hash:

This is the hex input for file md5coll1:

| d1 | 31 | dd | 02 | c5 | e6 | ee | c4 | 69 | 3d | 9a | 06 | 98 | af | f9 | 5c |
|---|---|---|---|---|---|---|---|---|---|---|---|---|---|---|---|
| 2f | ca | b5 | 87 | 12 | 46 | 7e | ab | 40 | 04 | 58 | 3e | b8 | fb | 7f | 89 |
| 55 | ad | 34 | 06 | 09 | f4 | b3 | 02 | 83 | e4 | 88 | 83 | 25 | 71 | 41 | 5a |
| 08 | 51 | 25 | e8 | f7 | cd | c9 | 9f | d9 | 1d | bd | f2 | 80 | 37 | 3c | 5b |
| d8 | 82 | 3e | 31 | 56 | 34 | 8f | 5b | ae | 6d | ac | d4 | 36 | c9 | 19 | c6 |
| dd | 53 | e2 | b4 | 87 | da | 03 | fd | 02 | 39 | 63 | 06 | d2 | 48 | cd | a0 |
| e9 | 9f | 33 | 42 | 0f | 57 | 7e | e8 | ce | 54 | b6 | 70 | 80 | a8 | 0d | 1e |
| c6 | 98 | 21 | bc | b6 | a8 | 83 | 93 | 96 | f9 | 65 | 2b | 6f | f7 | 2a | 70 |

This is the hex input for file mdcoll2

| d1 | 31 | dd | 02 | c5 | e6 | ee | c4 | 69 | 3d | 9a | 06 | 98 | af | f9 | 5c |
|---|---|---|---|---|---|---|---|---|---|---|---|---|---|---|---|
| 2f | ca | b5 | 07 | 12 | 46 | 7e | ab | 40 | 04 | 58 | 3e | b8 | fb | 7f | 89 |
| 55 | ad | 34 | 06 | 09 | f4 | b3 | 02 | 83 | e4 | 88 | 83 | 25 | f1 | 41 | 5a |
| 08 | 51 | 25 | e8 | f7 | cd | c9 | 9f | d9 | 1d | bd | 72 | 80 | 37 | 3c | 5b |
| d8 | 82 | 3e | 31 | 56 | 34 | 8f | 5b | ae | 6d | ac | d4 | 36 | c9 | 19 | c6 |
| dd | 53 | e2 | 34 | 87 | da | 03 | fd | 02 | 39 | 63 | 06 | d2 | 48 | cd | a0 |
| e9 | 9f | 33 | 42 | 0f | 57 | 7e | e8 | ce | 54 | b6 | 70 | 80 | 28 | 0d | 1e |
| c6 | 98 | 21 | bc | b6 | a8 | 83 | 93 | 96 | f9 | 65 | ab | 6f | f7 | 2a | 70 |

They both generate this md5 digest: 79054025255fb1a26e4bc422aef54eb4.

Accordingly, by providing more than one mathematical representation for the data inputs, mutual exclusion ensures that there is a higher statistical probability of uniqueness when validating the data through scanning Below is an example of digests included in an XML markup file, whereby different digests have been created for the above inputs, illustrating the concept of mutual exclusion:

```
<?xml version="1.0" encoding="ascii"?>
<!DOCTYPE COMPRESS_ARCH SYSTEM "compress2.dtd">
<ARCH>
<FILE>
<NAME>md5coll1</NAME>
<SIZE>128</SIZE>
```

-continued

```
<md t="SHA">a19e89df4ccb344af4f0372907d8ad7d40296ea5</md>
<mdr t="SHA">5aebda61fc4bc8ff3621f6304076b491a97a57ec</mdr>
<md t="RIPE160">9c20bd94bc95d93dddd607ebdf0e2944061ab816</md>
<mdr
t="RIPE160">d43b384a046b91536ab6cc1847ff4f906ba0e535</mdr>
<md t="MD5">79054025255fb1a26e4bc422aef54eb4</md>
<md t="MD5_REVERSE">63692f882033b4e2c13d437f35e33271</md>
<md t="MD4">4dca7748578ceefb18de6ea42af36aed</md>
<md t="MD2">85cf988625d154279d11de59bf377cc3</md>
<MODULUS>+9611342</MODULUS>
<FLOOR></FLOOR>
<CEIL></CEIL>
</FILE>
<FILE>
<NAME>md5coll2</NAME>
<SIZE>128</SIZE>
<md t="SHA">9ed5cd2e6678248ab42c69961720b910e3618288</md>
<mdr t="SHA">fbe543c5b550374b3f4818dc24e80af8615d191c</mdr>
<md t="RIPE160">70f686e0ae36f7e0d59da69b473749e92c087740</md>
<mdr
t="RIPE160">e3b2a7b5f2630314a8b77e2aa429cd308e0c7871</mdr>
<md t="MD5">79054025255fb1a26e4bc422aef54eb4</md>
<md t="MD5_REVERSE">bf5bf87f65e79b98af7985885f3e5ee0</md>
<md t="MD4">7a9919f9efb2ecae17012dcf94edc983</md>
<md t="MD2">358aba7632d39f6c41f400eedb7b31de</md>
<MODULUS>+4981022</MODULUS>
<FLOOR></FLOOR>
<CEIL></CEIL>
</FILE>
</ARCH>
```

In one embodiment, mutual exclusion verifies the least processor intensive hash, digest, or checksum associated with a particular data item first. In this way, the processor is not required to calculate intensive hashes, digests, or checksums for every number in the scan range. Accordingly, the number of processor intensive steps can be reduced. Additionally, by incorporating a collision counter (discussed in detail below), subsequent collisions can incorporate a unique collision number in order to uniquely identify the validation.

Subsequent mutual exclusion tests are only performed on the matching number. A cost pyramid can also be obtained for the higher cost signature digests or checksums being processed and tested last (and only if a previous checksum or test is successful) and the lower cost digests being processed first. If there are three digests it can only check the last 2 if the previous or prior checksum or digital signature test succeeds.

In step 206, where a checksum match has been found, the number resulting in the checksum match is written to an output file. If the checksum found is the first match, the checksum file may be created. In one embodiment, a block identifier determines the position of the found number in the output file. For example, a number corresponding to the identifier for block 1 would be placed in the first position of the output file, and a number corresponding to the identifier for block 2 would be appended to the end of block 1, but would appear before the number in block 3. In this way, multiple computers, processors, including distributed networks may be used to decompress files while at the same time preserving the desired order in the output file.

If all data has been verified, validation is complete and the output file is saved (step 208). If additional data is to be verified, flow continues to step 204.

Figure 2:
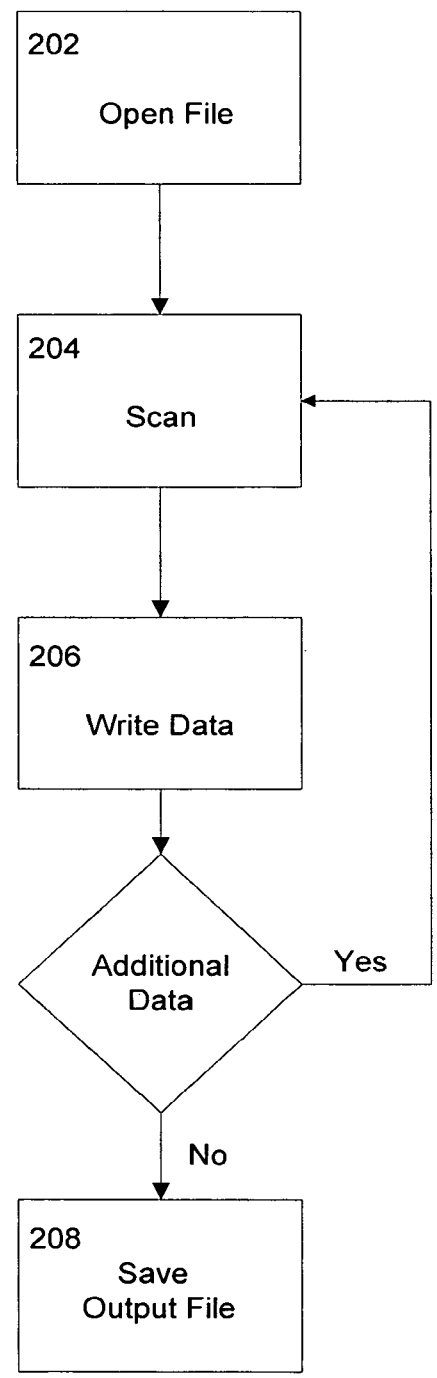
FIG. 2 is a flow chart illustrating the validation steps of the present systems and methods.
Figure 3:
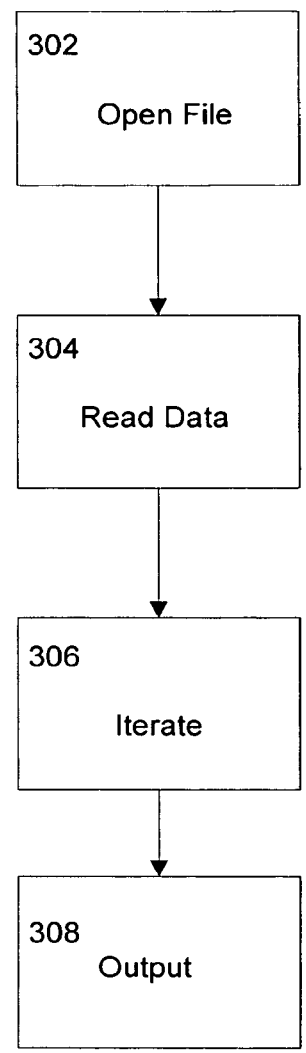
FIG. 3 is a flow chart further illustrating the operation of the flow in FIG. 2.

FIG. 3 is an example of the flow described in FIG. 2. As illustrated in step 302, a decompression program loads in a file named "file.archive." In step 304, it scans numbers from a to b and runs them through SHA and SHA-reverse and CRC to find a number that matches the SHA signature. In step 306, the blocks are iterated on from block 1 to block 7 to find a group of numbers that matches the block 1 to block 7 hash or checksum. SHA-reverse is the block in run through SHA in reverse. In step 308, after a number passes all of the checksums, it is output as a block. A description of the iteration process follows.

Iteration #1, Block #1
If Checksum is False for block entry 1 with respect to the defined compression methods
Processing continues to
Iteration #102999990128932901, Block #1
If the Checksum is True for block entry 1 with respect to the defined compression methods
The block is output to file.unarchive.
Processing continues for all next blocks.
Iteration #1, Block #n, to Iteration #n, Block #n.
Modulus Skipping Modulus skipping is related to the Chinese Remainder Theorem. This theorem answers questions such as: there is a number n divided by 233 which is, 3 and n divided by 6 is 7. What is the number? Modulus skipping involves answering the question such as: there is a binary number n which divided by a million (the modulus) is 1233, and whose SHA signature is x, and whose MD5 signature is Y, and whose length is 123 bytes. What is the integer binary number of 123 bytes?

Modulus skipping is a type of skipping scan as described above. A file typically constitutes a unique number in bits (i.e., a 2 byte file has a length of 16 bits and a numerical value from 0 to 65,536). A file number can represent the number formed by the bits of the file. A file number can be divided by another number to get a remainder. A smaller number will go into a larger number n times with a remainder x (modulus and remainder). In a preferred embodiment, a file number can have the modulus of its hash used as an iterator. In this way a file number can be represented as a multiple of its modulus plus the remainder. This allows a file to be searched for by iterating over the (modulus*iteration_number+the remainder) to find a signature match that equals the starting signature of an unknown file number block.

For example, a string can be compressed according to the present systems and methods. In this example, the term "hash" describes the result of the compression method. To find the original string one can scan over all combinations of strings to find one with the same hash or iterate over the modulus and the remainder to skip-scan for a data block that matches a hash.

For example, 1000 mod 15=10, or for the number 1000, using the modulus 15, has a remainder of 10. In other words, the number 1000 divided by 15 equals 66 (and 15*66=990) with 10 remaining A modulus scan can use this to reduce the number of iterations required to find a matching hash. Here, a modulus scan for the number 1000 would iterate 66 times versus 1000 for a non-modulus scan. The following table illustrates this point.

| Iteration n * | Modulus + | Remainder = | Result | Hash |
|---|---|---|---|---|
| 1 * | 15 + | 10 = | 25. | abcccc |
| 2 * | 15 + | 10 = | 40. | deeeee |
| 3 * | 15 + | 10 = | 55. | xeeeee |
| 4 * | 15 + | 10 = | 70. | eeerrrr |
| ... | | | | |
| 66 * | 15 + | 10 = | 1000. | eeeeee |

Accordingly, one may iterate over the modulus and hash the number until you find a number that matches a particular hash, rather than iterating through all the number combinations and taking the hash. In this way, one may iterate through a number's multiple of its modulus plus its remainder to find a number that matches a hash. This may seem very small until one takes a 1000 bit number block and the modulus of a 128 bit and the remainder number, which speeds up the hash search exponentially. This method can speed up a digital signature search by trillions of times and improve the uniqueness.

Below is an example of an iterative, non-skipping scan. String "a" is hashed and then a string is iterated over the permutations until a string number matches the hash from 0 Null to 97 Null in a c string.

The digest of string a is 86F7E437FAA5A7FCE15D1DDCB9EAEAEA377667B8
Digest String: 86F7E437FAA5A7FCE15D1DDCB9EAEAEA377667B8: string a!

| | | | | | |
|---|---|---|---|---|---|
| String | Digest | DA39A3EE5E6B4B0D3255BFEF95601890AFD80709 | 0 | 0 | 0 |
| String | Digest | BF8B4530D8D246DD74AC53A13471BBA17941DFF7 | 1 | 0 | 1 |
| String | Digest | C4EA21BB365BBEEAF5F2C654883E56D11E43C44E | 2 | 0 | 2 |
| String | Digest | 9842926AF7CA0A8CCA12604F945414F07B01E13D | 3 | 0 | 3 |
| String | Digest | A42C6CF1DE3ABFDEA9B95F34687CBBE92B9A7383 | 4 | 0 | 4 |
| String | Digest | 8DC00598417D4EB788A77AC6CCEF3CB484905D8B | 5 | 0 | 5 |
| String | Digest | 2D0134ED3B9DE132C720FE697B532B4C232FF9FE | 6 | 0 | 6 |
| String | Digest | 5D1BE7E9DDA1EE8896BE5B7E34A85EE16452A7B4 | 7 | 0 | 7 |
| String | Digest | 8D883F1577CA8C334B7C6D75CCB71209D71CED13 | 8 | 0 | 8 |
| String | Digest | AC9231DA4082430AFE8F4D40127814C613648D8E | 9 | 0 | 9 |
| String | Digest | ADC83B19E793491B1C6EA0FD8B46CD9F32E592FC | 10 | 0 | 10 |
| String | Digest | 067D5096F219C64B53BB1C7D5E3754285B565A47 | 11 | 0 | 11 |
| String | Digest | 1E32E3C360501A0EDE378BC45A24420DC2E53FBA | 12 | 0 | 12 |
| String | Digest | 11F4DE6B8B45CF8051B1D17FA4CDE9AD935CEA41 | 13 | 0 | 13 |
| String | Digest | 320355CED694AA69924F6BB82E7B74F420303FD9 | 14 | 0 | 14 |
| String | Digest | C7255DC48B42D44F6C0676D6009051B7E1AA885B | 15 | 0 | 15 |
| String | Digest | 6E14A407FAAE939957B80E641A836735BBDCAD5A | 16 | 0 | 16 |
| String | Digest | A8ABD012EB59B862BF9BC1EA443D2F35A1A2E222 | 17 | 0 | 17 |
| String | Digest | C4F87A6290AEE1ACFC1F26083974CE94621FCA64 | 18 | 0 | 18 |
| String | Digest | 5A8CA84C7D4D9B055F05C55B1F707F223979D387 | 19 | 0 | 19 |
| String | Digest | 3CE0A1AF90B6E7A3DD8D45E410884B588EA2D04C | 20 | 0 | 20 |
| String | Digest | 7762EABF9387FE8EC5D648CD3B1D9EB6D820CAA2 | 21 | 0 | 21 |
| String | Digest | A9D3C9CD54B1A392B21EA14904D9A318F74636B7 | 22 | 0 | 22 |
| String | Digest | 094D98B399BF4ACE7B8899AB7081E867FB03F869 | 23 | 0 | 23 |
| String | Digest | C2143B1A0DB17957BEC1B41BB2E5F75AA135981E | 24 | 0 | 24 |
| String | Digest | E9C5D7DB93A1C17D45C5820DAF458224BFA7A725 | 25 | 0 | 25 |
| String | Digest | EBDC2288A14298F5F7ADF08E069B39FC42CBD909 | 26 | 0 | 26 |
| String | Digest | 27F57CB359A8F86ACF4AF811C47A6380B4BB4209 | 27 | 0 | 27 |
| String | Digest | B830C46D24068069F0A43687826F355B21FDB941 | 28 | 0 | 28 |
| String | Digest | 5983AD8F6BFEA1DEDA79409C844F51379C52BE2D | 29 | 0 | 29 |
| String - | Digest | 7FD88C329B63B57572A0032CF14E3E9EC861CE5F | 30 | 0 | 30 |
| String - | Digest | 953EFE8F531A5A87F6D2D5A65B78B05E55599ABC | 31 | 0 | 31 |
| String | Digest | B858CB282617FB0956D960215C8E84D1CCF909C6 | 32 | 0 | 32 |
| String ! | Digest | 0AB8318ACAF6E678DD02E2B5C343ED41111B393D | 33 | 0 | 33 |
| String " | Digest | 2ACE62C1BEFA19E3EA37DD52BE9F6D508C5163E6 | 34 | 0 | 34 |
| String # | Digest | D08F88DF745FA7950B104E4A707A31CFCE7B5841 | 35 | 0 | 35 |
| String $ | Digest | 3CDF2936DA2FC556BFA533AB1EB59CE710AC80E5 | 36 | 0 | 36 |
| String % | Digest | 4345CB1FA27885A8FBFE7C0C830A592CC76A552B | 37 | 0 | 37 |
| String & | Digest | 7C4D33785DAA5C2370201FFA236B427AA37C9996 | 38 | 0 | 38 |
| String ' | Digest | BB589D0621E5472F470FA3425A234C74B1E202E8 | 39 | 0 | 39 |
| String ( | Digest | 28ED3A797DA3C48C309A4EF792147F3C56CFEC40 | 40 | 0 | 40 |
| String ) | Digest | E7064F0B80F61DBC65915311032D27BAA569AE2A | 41 | 0 | 41 |
| String * | Digest | DF58248C414F342C81E056B40BEE12D17A08BF61 | 42 | 0 | 42 |
| String + | Digest | A979EF10CC6F6A36DF6B8A323307EE3BB2E2DB9C | 43 | 0 | 43 |
| String , | Digest | 5C10B5B2CD673A0616D529AA5234B12EE7153808 | 44 | 0 | 44 |
| String − | Digest | 3BC15C8AAE3E4124DD409035F32EA2FD6835EFC9 | 45 | 0 | 45 |
| String . | Digest | 3A52CE780950D4D969792A2559CD519D7EE8C727 | 46 | 0 | 46 |
| String / | Digest | 42099B4AF021E53FD8FD4E056C2568D7C2E3FFA8 | 47 | 0 | 47 |
| String 0 | Digest | B6589FC6AB0DC82CF12099D1C2D40AB994E8410C | 48 | 0 | 48 |
| String 1 | Digest | 356A192B7913B04C54574D18C28D46E6395428AB | 49 | 0 | 49 |
| String 2 | Digest | DA4B9237BACCCDF19C0760CAB7AEC4A8359010B0 | 50 | 0 | 50 |
| String 3 | Digest | 77DE68DAECD823BABBB58EDB1C8E14D7106E83BB | 51 | 0 | 51 |
| String 4 | Digest | 1B6453892473A467D07372D45EB05ABC2031647A | 52 | 0 | 52 |
| String 5 | Digest | AC3478D69A3C81FA62E60F5C3696165A4E5E6AC4 | 53 | 0 | 53 |
| String 6 | Digest | C1DFD96EEA8CC2B62785275BCA38AC261256E278 | 54 | 0 | 54 |
| String 7 | Digest | 902BA3CDA1883801594B6E1B452790CC53948FDA | 55 | 0 | 55 |
| String 8 | Digest | FE5DBBCEA5CE7E2988B8C69BCFDFDE8904AABC1F | 56 | 0 | 56 |
| String 9 | Digest | 0ADE7C2CF97F75D009975F4D720D1FA6C19F4897 | 57 | 0 | 57 |
| String : | Digest | 05A79F06CF3F67F726DAE68D18A2290F6C9A50C9 | 58 | 0 | 58 |
| String ; | Digest | 2D14AB97CC3DC294C51C0D6814F4EA45F4B4E312 | 59 | 0 | 59 |
| String < | Digest | C4DD3C8CDD8D7C95603DD67F1CD873D5F9148B29 | 60 | 0 | 60 |
| String = | Digest | 21606782C65E44CAC7AFBB90977D8B6F82140E76 | 61 | 0 | 61 |
| String > | Digest | 091385BE99B45F459A231582D583EC9F3FA3D194 | 62 | 0 | 62 |
| String ? | Digest | 5BAB61EB53176449E25C2C82F172B82CB13FFB9D | 63 | 0 | 63 |
| String @ | Digest | 9A78211436F6D425EC38F5C4E02270801F3524F8 | 64 | 0 | 64 |
| String A | Digest | 6DCD4CE23D88E2EE9568BA546C007C63D9131C1B | 65 | 0 | 65 |
| String B | Digest | AE4F281DF5A5D0FF3CAD6371F76D5C29B6D953EC | 66 | 0 | 66 |
| String C | Digest | 32096C2E0EFF33B844EE6D675407ACE18289357D | 67 | 0 | 67 |
| String D | Digest | 50C9E8D5FC98727B4BBC93CF5D64A68DB647F04F | 68 | 0 | 68 |
| String E | Digest | E0184ADEDF913B076626646D3F52C3B49C39AD6D | 69 | 0 | 69 |

| | | The digest of string a is 86F7E437FAA5A7FCE15D1DDCB9EAEAEA377667B8 Digest String: 86F7E437FAA5A7FCE15D1DDCB9EAEAEA377667B8: string a! | | | |
|---|---|---|---|---|---|
| String F | Digest | E69F20E9F683920D3FB4329ABD951E878B1F9372 | 70 | 0 | 70 |
| String G | Digest | A36A6718F54524D846894FB04B5B885B4E43E63B | 71 | 0 | 71 |
| String H | Digest | 7CF184F4C67AD58283ECB19349720B0CAE756829 | 72 | 0 | 72 |
| String I | Digest | CA73AB65568CD125C2D27A22BBD9E863C10B675D | 73 | 0 | 73 |
| String J | Digest | 58668E7669FD564D99DB5D581FCDB6A5618440B5 | 74 | 0 | 74 |
| String K | Digest | A7EE38BB7BE4FC44198CB2685D9601DCF2B9F569 | 75 | 0 | 75 |
| String L | Digest | D160E0986ACA4714714A16F29EC605AF90BE704D | 76 | 0 | 76 |
| String M | Digest | C63AE6DD4FC9F9DDA66970E827D13F7C73FE841C | 77 | 0 | 77 |
| String N | Digest | B51A60734DA64BE0E618BACBEA2865A8A7DCD669 | 78 | 0 | 78 |
| String O | Digest | 08A914CDE05039694EF0194D9EE79FF9A79DDE33 | 79 | 0 | 79 |
| String P | Digest | 511993D3C99719E38A6779073019DACD7178DDB9 | 80 | 0 | 80 |
| String Q | Digest | C3156E00D3C2588C639E0D3CF6821258B05761C7 | 81 | 0 | 81 |
| String R | Digest | 06576556D1AD802F247CAD11AE748BE47B70CD9C | 82 | 0 | 82 |
| String S | Digest | 02AA629C8B16CD17A44F3A0EFEC2FEED43937642 | 83 | 0 | 83 |
| String T | Digest | C2C53D66948214258A26CA9CA845D7AC0C17F8E7 | 84 | 0 | 84 |
| String U | Digest | B2C7C0CAA10A0CCA5EA7D69E54018AE0C0389DD6 | 85 | 0 | 85 |
| String V | Digest | C9EE5681D3C59F7541C27A38B67EDF46259E187B | 86 | 0 | 86 |
| String W | Digest | E2415CB7F63DF0C9DE23362326AD3C37A9ADFC96 | 87 | 0 | 87 |
| String X | Digest | C032ADC1FF629C9B66F22749AD667E6BEADF144B | 88 | 0 | 88 |
| String Y | Digest | 23EB4D3F4155395A74E9D534F97FF4C1908F5AAC | 89 | 0 | 89 |
| String Z | Digest | 909F99A779ADB66A76FC53AB56C7DD1CAF35D0FD | 90 | 0 | 90 |
| String [ | Digest | 1E5C2F367F02E47A8C160CDA1CD9D91DECBAC441 | 91 | 0 | 91 |
| String \ | Digest | 08534F33C201A45017B502E90A800F1B708EBCB3 | 92 | 0 | 92 |
| String ] | Digest | 4FF447B8EF42CA51FA6FB287BED8D40F49BE58F1 | 93 | 0 | 93 |
| String  | Digest | 5E6F80A34A9798CAFC6A5DB96CC57BA4C4DB59C2 | 94 | 0 | 94 |
| String _ | Digest | 53A0ACFAD59379B3E050338BF9F23CFC172EE787 | 95 | 0 | 95 |
| String ` | Digest | 7E15BB5C01E7DD56499E37C634CF791D3A519AEE | 96 | 0 | 96 |
| String a | Digest | 86F7E437FAA5A7FCE15D1DDCB9EAEAEA377667B8 | | | |

Found string a with Digest 86F7E437FAA5A7FCE15D1DDCB9EAEAEA377667B8
Digest_string 86F7E437FAA5A7FCE15D1DDCB9EAEAEA377667B8

In one embodiment, using a modulus scan can reduce the total number of iterations to 9 or 10. For example, 97 mod 10=7, so every 10th number plus 7 is hashed to verify if the hash matches the original string hashed by a signature. If a match occurs, the string has been found.

| | | The digest of string a is 86F7E437FAA5A7FCE15D1DDCB9EAEAEA377667B8 Digest String: 86F7E437FAA5A7FCE15D1DDCB9EAEAEA377667B8: string a! | | | |
|---|---|---|---|---|---|
| String  | Digest | 5D1BE7E9DDA1EE8896BE5B7E34A85EE16452A7B4 | 7 | 0 | 7 |
| String  | Digest | A8ABD012EB59B862BF9BC1EA443D2F35A1A2E222 | 17 | 0 | 17 |
| String  | Digest | 27F57CB359A8F86ACF4AF811C47A6380B4BB4209 | 27 | 0 | 27 |
| String % | Digest | 4345CB1FA27885A8FBFE7C0C830A592CC76A552B | 37 | 0 | 37 |
| String / | Digest | 42099B4AF021E53FD8FD4E056C2568D7C2E3FFA8 | 47 | 0 | 47 |
| String 9 | Digest | 0ADE7C2CF97F75D009975F4D720D1FA6C19F4897 | 57 | 0 | 57 |
| String C | Digest | 32096C2E0EFF33D844EE6D675407ACE18289357D | 67 | 0 | 67 |
| String M | Digest | C63AE6DD4FC9F9DDA66970E827D13F7C73FE841C | 77 | 0 | 77 |
| String W | Digest | E2415CB7F63DF0C9DE23362326AD3C37A9ADFC96 | 87 | 0 | 87 |
| String a | Digest | 86F7E437FAA5A7FCE15D1DDCB9EAEAEA377667B8 | 97 | 0 | 97 |

Found string a with Digest 86F7E437FAA5A7FCE15D1DDCB9EAEAEA377667B8
Digest_string 86F7E437FAA5A7FCE15D1DDCB9EAEAEA377667B8.

The commented source code zsha_str.c, included in the attached Appendix 2, comprises a novel modification of the public domain program sha1.c, with the addition of an SHA iterator iterate function and a modification of the main function for strings.

In one embodiment, where a file is small, one can append the hash to a filename. For example, test.xyz with contents of "a" (as in the above example) becomes:

test.xyz.xz.sha.86F7E437FAA5A7FCE15D1DDCB9EA EAEA377667B8.xz, and the contents of the file (10 to 100 bytes) can be zero instead of 1. This enables very small files which are usually stored as 4k blocks to take advantage of 255 character filenames and hash filename appendages to encode the data as length 0. Note here that xyz, and xz may be additional descriptors for the file. For example test.xyz.xz may represent test.archive.01.

During validation, a scan would look for the filename, as well as a compression method (here as HASHTYPE), and a checksum value (here as HASHDIGEST). Other descriptors may be appended to the filename as well. For example, the modified filename could be represented as:

[FILENAME].xz.[HASHTYPE].[HASHDIGEST].zz, or
[FILENAME].xz.[HASHTYPE].[HASHDIGEST].[MODULUS].[HASHTYPE].[HASHDIGEST].xz

The Activeperl 5.6 sha6b.pl.file included in Appendix 2 adds the XML and DTD header information, as well as directory recursion, floor and command options, and ceiling calculation, It also includes the modulus calculation. It also has extended options to pick which things to run. The Perl script further demonstrates the utility and usefulness of XML signature beyond the W3C. The Perl files are dependent on some known windows Activeperl modules. In addition, the compress.xml files can be zipped, decreasing the size by about 3 to 1 over the xml output. Also included in Appendix 2 are the palindrome.txt.xml and compress_modulus2.xml files.

Markup Compression Layout

Compression markup files can be XML, SGML, or binary with certain markup tags. A markup language can be used along with a document type definition ("DTD") to define the compression file. A DTD can be used to validate that the compression file is correct and has not been damaged or contains data to allow decompression. An example of a DTD file follows.

```
<filename>file</filename> -- The filename tag is the input filename.
<block no="1"> -- The block tag is the file block 1 with the number "no" attribute as 1.
<blocksize>20000</blocksize> -- The blocksize tag denotes the size of the hashed block.
<blocklength>20000</blocklength> -- The blocklength denotes the length of the hashed file block.
</padded> -- The padding tag denotes whether the block is padded with zeroes.
<sha-reverse>42ded03c7 6f2e69e8 614b999b d1123333 8de47d88</sha-reverse> -- sha-reverse is the
SHA hash of the reversed bytes of block 1.
<sha>a1111e36 4706816a ba3e2571 7850c26c 9cd0d89d</sha> -- The sha tag is the SHA hashed bytes of
block in normal order.
<crc>12983712900000</crc> -- The crc tag is the CRC of the Block.
</block no="1"> -- The end of block 1.
<block no="2"> -- The start of block 2.
<blocksize>20000</blocksize>
<blocklength>20000</blocklength>
</padded>
<sha-reverse>a9b00e364706816aba3e25717850c26c9cd0d89d</sha-reverse>
<sha> 2d700c01 ff54cfd1 ba6771c5 99c1ac64 baf1acc7</sha>
<crc>129837129213123321</crc>
</block no="2">
<block no="3">
<blocksize>20000</blocksize>
<blocklength>20000</blocklength>
</padded>
<sha-reverse>a92222e364706816aba3e25717850c26c9cd0d89d</sha-reverse>
<sha> 2d795c01 ff54cfd1 ba6771c5 99c1ac64 baf1acc7</sha>
<crc>129837129</crc>
</block no="3">
<block no="4">
<blocksize>20000</blocksize>
<blocklength>20000</blocklength>
</padded>
<sha-reverse>a99233e364706816aba3e25717850c26c9cd0d89d</md5>
<sha> 2deffc01 ffaaaad1 ba6771c5 99c1ac64 baf1acc7</sha>
<crc>102839203342234</crc>
</block no="4">
<block no="5">
<blocksize>20000</blocksize>
<blocklength>20000</blocklength>
</padded>
<sha-reverse>a8883e364706816aba3e76555850c26c9cd0d89d</sha-reverse>
<sha> 2d795c01 ffffff ba6771c5 99c1ac64 baf1acc7</sha>
<crc>1298371291233</crc>
</block no="5">
<block no="6">
<blocksize>20000</blocksize>
<blocklength>20000</blocklength>
</padded>
<sha-reverse>eeeeee364706816aba3e25717850c26c9cd0d89d</sha-reverse>
<sha> 2d00Fc01 ffeeeed1 ba6771c5 99c1ac64 baf1acc7</sha>
<crc>12982344129</crc>
</block no="6">
<block no="7">
<blocksize>20000</blocksize>
<blocklength>293</blocklength>
</padded>
<sha-reverse>22222e364706816aba3e25717850c26c9cd0d89d</sha-reverse>
<sha> 00000c01 ff54cfd1 ba6771c5 99c1ac64 baf1acc7</sha>
<crc>129833129</crc>
</block no="7">
</file> -- The file tag is the end of file marker
```

Message Digest Processor

In one embodiment, a message digest processor is preferably adapted to perform the systems and methods described above. Such a processor can be a custom microprocessor dedicated to finding blocks of data associated with one or more checksum values. It is related to data compression with multiple message digests. It can speed up digest compression thousands millions or billions of times and make digest checksum compression feasible. In one embodiment, a digest processor could have any number of processors, e.g., hundreds to thousands of processor cores and thousands of processors depending on configuration and transistor size, and other features including memory core size and fixed programming or hard wired programming In one embodiment, a message digest processor can be one processor.

Figure 4:
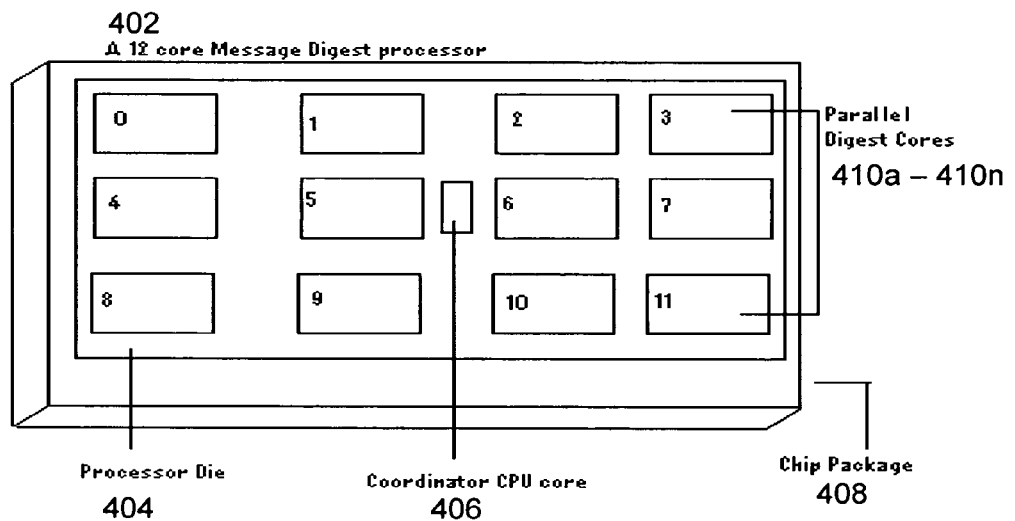
FIG. 4 is a block diagram illustrating a parallel message digest processor.

FIG. 4 is a diagram of a message digest processor. Shown in FIG. 4 is a 12 core message digest processor, 402. Said processor comprises 12 parallel processors, however, this is exemplary only, and any number of processors may be used. Also shown in FIG. 4, are processor die 404, coordinator CPU 406, chip package 408, and parallel digest cores 410a-410n. Elements of these components are described below. Exemplary features of a Message Digest Processor (MDP):

Allows a digest to be authenticated rapidly in parallel.

A MDP can validate whether a given checksum is unique or locate a binary number associated with a given checksum.

A Message Digest Processor can exist as a computer coprocessor that assists with verifying and validating signatures against a range of numbers to find the original binary input.

Multiple Message Digest Processor Chips can be chained together in Parallel.

A Message Digest Processor can have a master processor, 406, that determines whether execution halts or continues when a binary signature number is found or coordinates execution.

A Message Digest Processor can be termed a microcore architecture. A microcore processor consists of hundreds or thousands of small processor cores on a single processor chip die. A large core processor has less than a hundred cores.

A transistor chip die is divided into parallel processing cores 410a-410n with a minimum size. Each core has a scratchpad or buffer memory and program memory to test a binary number for a digest or digests against a given digest or modulus.

Processor instructions consist of a signature group bundle and modulus and byte size. Processor instructions can also consist of program to code to process a digital signature. The instructions are VLIW or very large instruction words and can be several 100 bytes long. Instructions can have variable length data. Instructions can consist of data and instruction signature code.

The processor can have multiple dedicated processor cores per processor,

Processor SIMD (Single Instruction Multiple Data).

The processor can find a group of n bytes that correspond with a given signature or modulus or checksum or a group of each.

Processor instructions can have groups of digital signatures and modulus pairs that compose a checksum associated with a specified size binary byte to find a specified binary number that matches the checksum group.

Independent Parallel processing allows each unit to run independently.

The checksum or signature code can be distributed to the processors.

Each processor can halt the processing if a binary number is found that corresponds with a given signature or modulus or continue if there are any collisions.

Each processor core is a minimal number of transistors for a maximal processing. The 68000 has 68,000+ transistors but would be an ideal size as a multicore signature processor.

Each processor core has a 512 or larger or smaller byte integer (big integer) calculation unit or memory buffer to allow numbers to be tested against a checksum or signature in parallel and iteratively to find a matching number with a set group of signatures.

Each processor has programming sufficient to calculate multiple digests (SHA, MD5, Ripe etc.) concurrently and store the results in registers for comparison with a given checksum group.

Each processor core has hash registers associated with the different digests (SHA register, MD5 register, Ripe register) as embedded code or loadable instruction code. The instruction can sit in a buffer and be distributed to the cores in a processor.

The Digest Instructions for a given Digest can be hard wired on the chip or programmed in a buffer.

For example, if a processor has a budget of 300 million transistors you could pack in 1000 or more processors for a core size of 300,000 transistors per processor core. Each processor core contains registers and large integer support of 512 bytes or larger and multiple message digest registers and program memory. A processor could even have a million cores.

In one embodiment, a processor instruction consists of any number of digests (checksum values), a modulus number, modulus remainder, modulus exponent, and collision numbers if there is one for a given group of digests, and checksum instruction code for the different digests. These instructions can be loaded into core memory at run time or from a central flash chip which can update the message digest programming and distribute it to the cores. Each core is assigned an iteration number to multiply the digest block by the core number. As described above, if there are 1000 cores then an iteration could be described as n*the modulus number*the core number+the big integer register number. The remainder is loaded into a 512-byte big integer register. If there is an exponent the modulus number is raised to the power of the exponent and added to the remainder in the big integer register. Each iteration the processor increments the 512-byte big integer by ((processornumber+startingnumber) the modulus number+ (the register number or the remainder)). The processor runs any number of checksum tests on the big integer (which may be any size, but here is 512 bytes or larger), and tests to see if there is a match with a given package of checksums (described above).

For example, if processor core 12 finds a 512-byte integer that matches a given message digest or group then it can return an interrupt to a watch-keeper processor. A watch-keeper processor determines if there are any possible collisions and halts the processors and returns the big integer block of bytes that are in core 12 if there are no other collisions. Having more than one digest allows for mutual exclusion. Having a 512-byte block with 3 or 4 digests of 20 bytes and a modulus remainder and exponent allows for parallel and distributed searching of a block matching the digests. A modulus can also be chosen that produces a remainder with the least number of digits.

A parallel modulus scan can be demonstrated by an iteration table from a group of n processors*n cpu cores per processor. To clarify this it should be the cpu iteration result*modulus+remainder (e.g., a number's hash or digest). It could also be the modulus raised to a power+the modulus*n cpu iteration result+the remainder hashed. This is related to the Chinese Remainder Theorem which deals with questions such as: there is a number n whose remainder divided by 12 is 3 and divided by 17 is 6 and divided by 8 is 2, what is the number? The Chinese Remainder Theorem will put this result in terms of an equation n*modulus+the remainder (i.e., nu+remainder where n is the modulus and u is an unknown number). A proper variant of the Chinese Remainder Theorem is (n^z+n*u+remainder=some number which characterizes the numbers with a logarithm and exponent where n is the modulus and u and z are some number plus the remainder. An example is 45 modulus 2 which is remainder 1. The number 2^5=32. 2*6=12. So (2^5)+(2*6)+1=45. The number 47 mod 3=2. 3^3=27. 2*9=18. So (3^3)+(2*9)+2=47).

For example, take the number of processors (as an example 10 processors with 1 core per processor.). For iteration 1 each processor starts with a core number 1 through 10. Then the total number of processors is added to the starting number of iteration 1 for iteration 2 to some number n. Below is a table for a 10 core processor with the core iterand of 10.

In iteration 1 each core or processor is assigned an initial number from 1 to 10. Shown in iteration 2 is the processor starting number value+the number of processors and cores (10 processors or cores). Iterations 3 or more show the starting number plus the core or processor total.

This is an iteration table for 10 microprocessors. The resulting number is multiplied times the modulus+the remainder in parallel and tested in parallel to find a matching hash. The numbers 1 through 10 can also be assigned as processor IDs or starting values or numbers. The processors can also be assigned 0 to 9.

```
Iteration table cpu n (1 to 10)
===============================
 1  2  3  4  5  6  7  8  9 10 : Iteration 1 each core is assigned a number
11 12 13 14 15 16 17 18 19 20 : Iteration 2 = starting value n + 10 (cpus)
21 22 23 24 25 26 27 28 29 30 : Iteration 3 = n + 10: So 11 + 10 = 21.
31 32 33 34 35 36 37 38 39 40 : Iteration 4
41 42 43 44 45 46 47 48 49 50 : Iteration 5
51 52 53 54 55 56 57 58 59 60 : Iteration 6
61 62 63 64 65 66 67 68 69 70 : Iteration 7
Iteration table cpu n (0 to 9)
For iteration 1 Each processor is assigned an initial number
Processor 1 is assigned a number ID of 0
Processor 2 is assigned a number ID of 1
Processor 3 is assigned a number ID of 2
Processor 4 is assigned a number ID of 3
Processor 5 is assigned a number ID of 4
Processor 6 is assigned a number ID of 5
Processor 7 is assigned a number ID of 6
Processor 8 is assigned a number ID of 7
Processor 9 is assigned a number ID of 8
Processor 10 is assigned a number ID of 9
 0  1  2  3  4  5  6  7  8  9 : Iteration 1 Assign each core a number
                                 (0 - 9)
10 11 12 13 14 15 16 17 18 19 : Iteration 2 = starting value n + 10 (cpus)
20 21 22 23 24 25 26 27 28 29 : Iteration 3 New number is the previous
                                 value n + 10: So for cpu 0, iteration 3
                                 value is 20, 10 + 10 = 20.
30 31 32 33 34 35 36 37 38 39 : Iteration 4
40 41 42 43 44 45 46 47 48 49 : Iteration 5
50 51 52 53 54 55 56 57 58 59 : Iteration 6
50 61 62 63 64 65 66 67 68 69 : Iteration 7
```

Example 1: A number divided by (modulus) 12 is 2 and has a signature of x find the number.

In this iteration table each of the 10 processors splits up the numbers and checks to see if there is a given number u*the modulus+the remainder 2 whose signature or checksum (where a checksum can be a group of signatures or moduluses or CRCs) is x. It can do this in parallel and halt execution or continue if there is a collision where one or more numbers share a signature or signatures and there is a collision number that is being searched for.

(0*12+2=2)(1*12+2=14)(2*12+2=26)(3*12+2=38)
   (4*12+2=50)(5*12+2=62)(6*12+2=74)(7*12+
   2=86)(8*12+2=98)(9*12+2=110): Iteration 1

(10*12+2=122)(11*12+2=134)(12*12+2)(13*12+2)
   (14*12+2)(15*12+2)(16*12+2)(17*12+2)(18*12+2)(19*12+2):
   Iteration 2=starting value n+10 (cpus)

(20*12+2)(21*12+2)(22*12+2)(23*12+2)(24*12+2)
   (25*12+2)(26*12+2)(27*12+2)(28*12+2)(29*12+
   2) . . . : Iteration 3=previous n+10: So 10+10=20.

It continues adding and hashing or running the checksum tests on the resulting binary number in each processor until it finds a matching checksum or signature or processing is halted.

For (0*12+2=2) the result 2 is run through a checksum and if the output checksum matches a given checksum and no collision numbers exist then the number is returned.

This is a table of 4 processor cores starting with 0 to 3. For each starting processor value. It increments the previous value by 4 for each iteration.

```
Iteration table cpu n (1 to 4)
==============================
0 1  2  3 : Iteration 1: This is multiplied with the modulus plus the
            remainder and hashed and then tested.
4 5  6  7 : Iteration 2
8 9 10 11 : Iteration 3
==============================
```

The Compression Checksum Archive DTD

There are various XML DTDs to record signatures and hashes. This XML DTD is designed to express the markup required for generating XML compression files with Message Digests and checksums. A package of signatures and constrictors provides a method of finding by brute force a matching block of data associated with a checksum. A Compression XML DTD uses the digital signatures and hashes and Modulus to express a unique identifier that can be used to reverse scan for a black of data with the signature attributes. A normal signature Message Digest DTD is fairly general. The advantage of this DTD is that it can be flexible by allowing a program to choose the XML format as attributes or tags. The XML markup consists of hash packages that correspond to files within an archive. The archive is an XML tree that contains the files and directories and file structure and the associated signature and file metadata. This has two uses one of which is to regenerate the data and the other is to allow for security by providing an enhanced Message Digest or signature file for verifying the content of data and also to verify that the data has not been altered or changed.

The XML compression archive DTD allows for the content of the XML archive to be verified and checked. A file can be tested against a DTD to ensure that the structure and content is valid.

XML allows the structure of a compression file to be seen. The compression archive data is not normally seen in regular binary compressed files. Having a file in XML allows for the various structures to be seen that denote the file attributes. The disadvantage with XML is that there is some overhead in the expression of the data in tags versus binary expression of the data. However, the compress.xml files can be zipped or compressed with a regular file compressor to reduce their size.

The XML compression archive can be used as a metabase to record system file changes and to crawl the directory tree of a computer file system and provide much greater security and integrity checking.

The following is a demonstrative XML DTD of a signature archive for compression and data integrity checking.

Tags and Attributes and Examples

There are various XML DTDs to record signatures and hashes. This XML DTD is designed to express the markup required for generating XML compression files with Message Digests and checksums. A package of signatures and constrictors provides a method of finding by brute force a matching block of data associated with a checksum. A Compression XML DTD uses the digital signatures and hashes and Modulus to express a unique identifier that can be used to reverse scan for a black of data with the signature attributes. A normal signature Message Digest DTD is fairly general. The advantage of this DTD is that it can be flexible by allowing a program to choose the XML format as attributes or tags. The XML markup consists of hash packages that correspond to files within an archive. The archive is an XML tree that contains the files and directories and file structure and the associated signature and file metadata. This has two uses one of which is to regenerate the data and the other is to allow for security by providing an enhanced Message Digest or signature file for verifying the content of data and also to verify that the data has not been altered or changed.

The XML compression archive DTD allows for the content of the XML archive to be verified and checked. A file can be tested against a DTD to ensure that the structure and content is valid.

XML allows the structure of a compression file to be seen. The compression archive data is not normally seen in regular binary compressed files. Having a file in XML allows for the various structures to be seen that denote the file attributes. The disadvantage with XML is that there is some overhead in the expression of the data in tags versus binary expression of the data. However, the compress.xml files can be zipped or compressed with a regular file compressor to reduce their size.

The XML compression archive can be used as a metabase to record system file changes and to crawl the directory tree of a computer file system and provide much greater security and integrity checking.

The following is a demonstrative XML DTD of a signature archive for compression and data integrity checking.

The markup of a archive file can be expressed as tags or as attributes.

The file out is an example of the tagged markup of an xml archive. Each property of a computer file from the file name and file size or file length to the corresponding files digital signatures or message digests or checksums can be encoded as a tag. In this instance The SHA tag represents the SHA signature of the file and SHA_REVERSE represents the reverse of the file run through the SHA. In XML compression archives various tags and there meaning must be well defined. The SHAMODULUS tag represents the file and it's associated content and a big integer of thousands of bytes with the modulus remainder of the SHA digest. The MODULUSEXPONENT represents the power that a modulus can be raised to by using logarithms to create an exponent. A logarithm of the file bytes converted to a big integer and modulus used as a base number creates an exponent. This exponent captured within the MODULUSEXPONENT tag creates an exponent that will represent the exponent power the modulus can be raised to calculate the file number. To find the original big integer value of the file or block the modulus is raised to an exponent and added by a multiple of the modulus incremented by n plus the remainder and run through the digest. If there is no exponent then the modulus would incremented by some n * modulus plus the modulus remainder.

```
<?xml version = "1.0" encoding = "UTF-8" ?>
<!DOCTYPE COMPRESS_ARCH SYSTEM "compress2.dtd">
<FILE>
    <NAME>out</NAME>
    <SIZE>3961651</SIZE>
    <SHA>54173139a00072fdfa3988f1b8cf0e4e9baf31ee</SHA>
    <SHA_REVERSE>5563965239ce4ae6e66b23ed68afcdb8323557
        7b
    </SHA_REVERSE>
    <MD5>f11ef3dfe3815469a41d8ec29157d32c</MD5>
    <MD4>e0f9a130b5ea1256d8c75126d26a6179</MD4>
    <MD2>26080751c1200a69978fdad60f886f1f</MD2>
    <FLOOR />
    <CEIL />
    <SHAMODULUS>31222</SHAMODULUS>
    <MODULUSEXPONENT>222</MODULUSEXPONENT>
    <COLLISION_NUMBER>12</COLLISION_NUMBER>
</FILE>
```

An attribute archive encodes the XML data in tags with attributes that are more abstract. The file can be encoded entirely with tags or attributes or a composite of both tags and attributes.

In this example the filename is palindrome.txt and the md tag represents the message digest with attribute t represents the digest type, which is the Secure Hash Algorithm (SHA). The mdr tag represents the file data run in reverse through the SHA hash. The md tag with the t attribute of MD5 would represent the MD5 message digest. The floor or ceiling tag would represent some factorial that is above or below the file big integer number (which represents the numeric value or product of the bytes of a file).

```
<?xml version = "1.0" encoding = "UTF-8" ?>
    <!DOCTYPE COMPRESS_ARCH SYSTEM "compress2.dtd">
    <ARCH>
        <FILE>
            <NAME>palindrome.txt</NAME>
            <SIZE>12</SIZE>
        <md
            t="SHA">d2d2922f9c0bea8ac448a2c67741eca8bba4a2
            71</md>
<mdr
t="SHA">d2d2922f9c0bea8ac448a2c67741eca8bba4a271</mdr
> <md t="RIPE160">
b7bda536ef319629b87b1a564678907834bdabae</md>
<mdr t="RIPE160">
b7bda536ef319629b87b1a564678907834bdabae</mdr>
        <md
            t="MD5">86e444818581edddef062ad4ddcd00dd</md>
        <md
            t="MD4">ae93876f99f0013b969313ee5483c051</md>
        <md
            t="MD2">141ecbaa14a70771003b4b6973522c14</md
            >
```

```
        <MILLIONMODULUS>+98097</MILLIONMODULUS>
        <FLOOR>+54</FLOOR>
        <CEIL>+55</CEIL>
    </FILE>
</ARCH>
```

The next section provides a list of various tags and there usage.
Element Arch
Model

```
<!ELEMENT ARCH (DIRECTORY?, FILE+)>
<!ATTLIST ARCH name CDATA #IMPLIED>
```

Description
The element Arch represents the start of a compression archive.
Usage
Element Directory
Model

```
<!ELEMENT DIRECTORY (NAME?, PASSWORD?, FILE+)>
<!ATTLIST DIRECTORY N CDATA #IMPLIED>
<!ATTLIST DIRECTORY S CDATA #IMPLIED>
```

Description
The element Directory represents the start of directory file attributes of an archive. A directory consists of more than one file element or tag. A directory has a name or password tag that is optional. The directory name can also be expressed in the n attribute. The s attribute can also denote size or the number of directory files.
Usage
Element DIR
Model

```
<!ELEMENT DIR (NAME?, PASSWORD?, FILE+)>
<!ATTLIST DIR N CDATA #IMPLIED>
<!ATTLIST DIR S CDATA #IMPLIED>
```

Description
The element Dir represents the start of directory file attributes of an archive. A directory consists of more than one file element or tag. A directory has a name or password tag that is optional. The directory name can also be expressed in the n attribute. The s attribute can also denote size or the number of directory files.
Usage
<DIR n="filename">
Element File
Model

```
ELEMENT FILE (NAME?, SIZE?, TIME?, BLOCK*, OS?,
BYTEORDER?,
PASSWORD?, CRC?, MD?, MDR?, MDC?, MDX?, SHA,
SHA_REVERSE?, MD2?,
MD2_REVERSE?, MD3?, MD3_REVERSE?, MD4?,
MD4_REVERSE?, MD5?,
MD5_REVERSE?, COLLISION_NUMBER?, FLOOR?, CEIL?)>
<!-- File Name attribute N -->
<!ATTLIST File N CDATA #IMPLIED>
<!-- File Size in Bytes attribute S -->
<!ATTLIST File S CDATA #IMPLIED>
```

Description
The element File represents the file content including digests and checksums and signatures data of a compression archive. A file can have multiple properties within the elements or tags including filename file length and collision number or floor or ceiling for which to scan for a message digest match. The floor or ceiling or modulus or logarithm exponents represent constrictors within which to scan for a block of data matching the package of digests or checksums associated with a file. A file can have a filename tag or operating system tag, password, message digest tag, collision_number, floor or ceiling. These file tags can also be expressed as attributes or blocks of delineated text. Additional attributes or tags can also be added. The byte order tag or possible attribute specifies the file or digital signature byte order whether big-endian or little-endian.
Usage
Element Name
Model
<!ELEMENT NAME (#PCDATA)>
Description
The element Name represents the start of a name of a file within the compression archive.
Usage
Element OS
Model
<!ELEMENT OS (#PCDATA)>
Description
The element OS represents operating system parameter tag of a file.
Usage
Element Byteorder
Model
<!ELEMENT BYTEORDER (#PCDATA)>
Description
The element BYTEORDER represents byte order parameter tag of a file. This specifies whether it is little-endian or big-endian format for the bytes. It can also specify other byte-orders of a digital signature input data or file input so that the signature will be reproducible on different order computers.
Usage

```
<BYTEORDER>little-endian</BYTEORDER>
<BYTEORDER>big-endian</BYTEORDER>
Or
<BYTEORDER>l </BYTEORDER>
<BYTEORDER>b </BYTEORDER>
```

Element Password
Model
<!ELEMENT PASSWORD (#PCDATA)>
Description
The element Password represents the password protection of a file the compression archive. A password tag represents that some seed has been mixed in with the digests to encrypt or protect the data.

Usage
Element Block
Model

```
<!ELEMENT BLOCK (#PCDATA)>
<!ATTLIST BLOCK NUM CDATA #REQUIRED>
<!ATTLIST BLOCK LNG CDATA #REQUIRED>
```

Description
The element Block represents the block of a file. This allows for a file to be split into multiple blocks of n sized bytes. The blocks can have digests or signatures. The various signatures can be nested so that the blocks and tested individually. A modulus scan allows for iteration over a series of data to check for a block of data with an associated checksum or signature. The entire file output can be tested to ensure that the signature matches the package of signatures or checksums.
Usage
Element Size
Model
<!ELEMENT SIZE (#PCDATA)>
Description
The element size represents the size of a file block or file in bytes.
Usage
Element Time
Model
<!ELEMENT TIME (#PCDATA)>
Description
The element time represents the time a signature group was run on a file.
Usage
<TIME>April 11, 2005 12:33PM</TIME>
Element MD
Model

```
<!ELEMENT MD (#PCDATA)>
<!ATTLIST MD t CDATA #REQUIRED>
<!ATTLIST MD l CDATA #REQUIRED>
```

Description
The element MD represents the message digest of a file block or file. The t attribute represents the digest type and the l attribute represents the digest length in bytes.
Usage
Element MDR
Model

```
<!ELEMENT MDR (#PCDATA)>
<!ATTLIST MDR t CDATA #REQUIRED>
<!ATTLIST MDR l CDATA #REQUIRED>
```

Description
The element MDR represents the message digest of the reverse of a file block or file. Every hash or digital signature has the reverse transform where the reverse of the input generates a different hash. The extreme condition is a palindrome where the signature or digest is the same forwards or backwards. The t attribute represents the digest type and the l attribute represent the digest length in bytes.

Usage
Element MDX
Model

```
<!ELEMENT MDX (#PCDATA)>
<!ATTLIST MDX t CDATA #REQUIRED>
<!ATTLIST MDX l CDATA #REQUIRED>
```

Description
The element MDX represents the user defined digest block. The t attribute represents the digest
Type and the l attribute represents the digest length in bytes.
Usage
Element MDC
Model

```
<!ELEMENT MDC (#PCDATA)>
<!ATTLIST MDC t CDATA #REQUIRED>
<!ATTLIST MDC l CDATA #REQUIRED>
```

Description
The element MDC represents a chopped hash or digital signature. Basically this means that a signature such as SHA can hash a block of data or a file. The resulting 20 byte hash or 40 byte hex hash can be chopped to 2 bytes or as many bytes as required. So if a checksum or digital signature has a length of 20 bytes then if the MDC length is 2 then only 2 bytes or 4 characters are selected. A hex version of a 20 byte signature will be 40 characters long. The t attribute represents the type and the l attribute represents the length.
Usage

```
<mdc t="SHA" l="1">d2</mdc>
<mdc t="RIPE160" l="3">b7bda5</mdc>
<mdc t="MD2" l="2">141e</mdc>
```

Element SHA
Model
<!ELEMENT SHA (#PCDATA)>
Description
The element SHA represents a SHA 160 bit digital signature. Basically this means that a signature such as SHA can hash a block of data or a file
Usage
Element SHA_Reverse
Model
<!ELEMENT SHA_REVERSE (#PCDATA)>
Description
The element SHA represents a SHA 160 bit digital signature reverse. Basically this means that a signature such as SHA reverse can hash a block of data or a file.
Usage
Element MD5
Model
<!ELEMENT MD5 (#PCDATA)>
Description
The element MD5 represents an MD5 (Message Digest 5) digital signature. Basically this means that a signature such as MD5 can hash a block of data or a file and encode the hash as hex within the MD5 open and close tags or element. The MDC can be used to generate hash collisions or to create collision_number tags for small data.

Usage
Element MD5_Reverse
Model
<!ELEMENT MD5_REVERSE (#PCDATA)>
Description
   The element MD5 represents an MD5 digital signature with reverse input of the file or file block. Basically this means that a signature such as MD5 can hash the reverse of a block of data or a file and encode the hash as hex within the MD5_REVERSE open and close tags or element.
Usage
Element MD4
Model
<!ELEMENT MD4 (#PCDATA)>
Description
   The element MD4 represents an MD4 digital signature. Basically this means that a signature such as MD4 can hash a block of data or a file and encode the hash as hex within the MD4 open and close tags or element.
Usage
Element MD4_Reverse
Model
<!ELEMENT MD4_REVERSE (#PCDATA)>
Description
   The element MD4 represents an MD4 digital signature with reverse input of the file or file block. Basically this means that a signature such as MD4 can hash the reverse of a block of data or a file and encode the hash as hex within the MD4_REVERSE open and close tags or element.
Usage
Element MD3
Model
<!ELEMENT MD3 (#PCDATA)>
Description
   The element MD3 represents an MD3 digital signature. Basically this means that a signature such as MD3 can hash a block of data or a file and encode the hash as hex within the MD3 open and close tags or element.
Usage
Element MD3_Reverse
Model
<!ELEMENT MD3_REVERSE (#PCDATA)>
Description
   The element MD3 represents an MD3 digital signature with reverse input of the file or file block. Basically this means that a signature such as MD3 can hash the reverse of a block of data or a file and encode the hash as hex within the MD3_REVERSE open and close tags or element.
Usage
Element MD2
Model
<!ELEMENT MD2 (#PCDATA)>
Description
   The element MD2 represents an MD2 digital signature. Basically this means that a signature such as MD2 can hash a block of data or a file and encode the hash as hex within the MD2 open and close tags or element.
Usage
Element MD2_Reverse
Model
<!ELEMENT MD2_REVERSE (#PCDATA)>
Description
   The element MD2 represents an MD2 digital signature with reverse input of the file or file block. Basically this means that a signature such as MD2 can hash the reverse of a block of data or a file and encode the hash as hex within the MD2_REVERSE open and close tags or element.

Usage
Element Collisionnumber
Model
<!ELEMENT COLLISIONNUMBER (#PCDATA)>
Description
   The element Collisionnumber represents the collision number constraint over which the modulus scan or skip scan should iterate. This is a constraint to differentiate possible blocks of data that share the same signature or signature block. Groups of signatures also ensure that data is differentiated over a set of iterations. A modulus scan will also differentiate and reduce the amount of iterations to find a block of data associated with a package of checksums or signatures. However, on occasion that a collision exists (which it can in the case of the chop hash tag) the collision number tag will differentiate collisions.
Usage
Element Floor
Model
<!ELEMENT FLOOR (#PCDATA)>
Description
   The element Floor represents the floor constraint over which the modulus scan or skip scan should iterate. This is a constraint to minimize the amount of iterations to find a block of data associated with a package of checksums or signatures. Typically this represents a bottom up scan.
Usage
Element Cell
Model
<!ELEMENT CEIL (#PCDATA)>
Description
   The element Ceil represents the ceiling constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block.
Usage
Element Fact
Model
<!ELEMENT FACT (#PCDATA)>
Description
   The element Fact represents the Factorial constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block.
Usage
Element Shamodulus
Model
<!ELEMENT SHAMODULUS (#PCDATA)>
Description
   The element SHAMODULUS represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the number takes the modulus of the SHA digest to generate the remainder. The remainder of the modulus is captured within the SHAMODULUS open and closed tags to provide for modulus scans or iteration.
Usage
Element MD5Modulus
Model
<!ELEMENT MD5MODULUS (#PCDATA)>
Description The element MD5MODULUS represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the number takes the modulus of the MD5 digest to generate the remainder. The remainder of the modulus is captured within the MD5MODULUS open and closed tags to provide for modulus scans or iteration.
Usage
Element Modulus
Model

```
<!ELEMENT MD5MODULUS(#PCDATA)>
<!ATTLIST MODULUS n CDATA #IMPLIED>
```

Description

The element MODULUS represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the file number big integer takes the modulus of the n attribute to generate the remainder. The remainder of the modulus is captured within the MODULUS open and closed tags to provide for modulus scans or iteration. The modulus tag can have a default value.
Usage The tag captures the modulus remainder of the file converted to a big integer modulus some value captured in the n attribute.
Element Hundredmodulus
Model
<!ELEMENT HUNDREDMODULUS (#PCDATA)>
Description The element HUNDREDMODULUS represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the filenumber takes the modulus 100 to generate the remainder. The remainder of the modulus is captured within the MODULUS open and closed tags to provide for modulus scans or iteration.

Usage
Element Thouseandmodulus
Model
<!ELEMENT THOUSANDMODULUS (#PCDATA)>
Description The element THOUSANDMODULUS represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the filenumber takes the modulus 1000 to generate the remainder. The remainder of the modulus is captured within the THOUSANDMODULUS open and closed tags to provide for modulus scans or iteration.
Usage
Element Millionmodulus
Model
<!ELEMENT MILLIONMODULUS (#PCDATA)>
Description The element MILLIONMODULUS represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the filenumber takes the modulus of 1 million to generate the remainder. The remainder of the modulus is captured within the MILLIONMODULUS open and closed tags to provide for modulus scans or iteration.
Usage
Element Billionmodulus
Model
<!ELEMENT BILLIONMODULUS (#PCDATA)>
Description The element BILLIONMODULUS represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the filenumber takes the modulus of 1 billion to generate the remainder. The remainder of the modulus is captured within the BILLIONMODULUS open and closed tags to provide for modulus scans or iteration.
Usage
Element DMOD
Model

```
<!ELEMENT DMOD (#PCDATA)>
<!ATTLIST BLOCK A CDATA #REQUIRED>
<!ATTLIST BLOCK B CDATA #REQUIRED>
```

Description

The element DMOD represents the double modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the binary filenumber takes a pair of modulus numbers to generate remainder pair. The remainder of the modulus is captured within the DMOD open and closed tags to provide for modulus scans or iteration. The pair of modulus numbers can be set by using them within the attribute a and attribute b and then putting the remainders within the DMOD tag separated with commas. If there are three arguments then the first number is modulus a then a comma and the second number is an exponent that modulus a can be raised to and then a comma precedes the third number which is the second modulus. This enables one modulus to be iterated over and a second modulus to be used as a test that is run before any other signatures for checksum verification.

An example of this is the following numeric problem is where there is a binary number x that divided by a million (modulus a) is 12333 and divided by (123333) modulus b is 1232 and whose SHA signature is 20 bytes and whose MD5 signature is 16 bytes and the modulus a has an exponent power of 23 find the number. It also creates a modulus pair for the file signature.

Usage

```
<DMOD a="1000000" b="123332">12333,23,1232</DMOD>
<DMOD>123332,123332</DMOD>
```

Element Modulusexponent
Model
<!ELEMENT MODULUSEXPONENT (#PCDATA)>
Description
The element MODULUSEXPONENT represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the filenumber takes the modulus of n to generate the remainder. The modulus can be raised to a power or exponent generated by the logarithm of the file number big integer and the modulus base to find an exponent to which the modulus can be iterated+the remainder. (i.e., (modulus^1200$^{th}$ power)+(modulus*1000)+remainder) to reduce the number of iterations to find a block.
Usage

```
<BILLIONMODULUS>12333<MODULUSEXPONENT>122</MODULUSEXPONENT></BILLIONMODULUS>
```

Element Modulusmultiple
Model
<!ELEMENT MODULUSMULTIPLE (#PCDATA)>
Description
The element MODULUSMULTIPLE represents the modulus scan constraint over which the modulus scan or skip scan should iterate. This is a constraint to minimize the amount of iterations to find a block of data associated with a package of checksums or signatures. Typically this represents a bottom up scan but can also represent a top down or reverse scan with the ceiling as the starting point in a search for matches to a given package of attributes for a file or block. A file and the associated bytes are converted to a big integer or number and then the filenumber takes the modulus of n to generate the remainder. The modulus can be multiplied by the modulus multiple (ie 1000 * modulo) to reduce the number of iterations to find a block.
Usage
<MODULUSMULTIPLE>1000</MODULUSMULTIPLE>

This is a second usage example. This represents an alternative usage where the Modulus of a number is 1 hundred and the remainder is 12333 and the modulus of 1 hundred can be raised to an exponent of 122 and has a multiple of 1000. This forms the equation there is a number that divided by a hundred is 33 and whose modulus exponent is 122 and has a modulus multiple of 1000 find the number. The modulus multiple is separate from the exponent so it forms an equation $100^{\wedge}122+100*1000$

```
<HUNDREDMODULUS>33<MODULUSEXPONENT>122</MODULUSEXPONENT><MODULUSMULTIPLE>1000</MODULUSMULTIPLE></HUNDREDMODULUS>
```

Element NUM
Model
<!ELEMENT NUM (#PCDATA)>
Description
The element NUM represents a hex output of some of the bytes of a file or a general number to define the modulus number.
Usage

```
<NUM>100000</NUM>
<MODULUS><NUM>1000</NUM>12321213213213</MODULUS>
```

Element CRC
Model
<!ELEMENT CRC (#PCDATA)>
Description
The element CRC represents a CRC checksum.
Usage
Below is a basic checksum digital signature XML archive DTD.

| Compress2.dtd |
|---|

```
<!ELEMENT ARCH (DIRECTORY?, FILE+)>
<!ATTLIST ARCH name CDATA #IMPLIED>
<!ELEMENT DIRECTORY (NAME?, PASSWORD?, FILE+)>
<!ATTLIST DIRECTORY N CDATA #IMPLIED>
<!ATTLIST DIRECTORY S CDATA #IMPLIED>
<!ELEMENT DIR (NAME?, PASSWORD?, FILE+)>
<!ATTLIST DIR N CDATA #IMPLIED>
<!ATTLIST DIR S CDATA #IMPLIED>
<!--Element File: "<FILE N="Filename" S="1232233">...</FILE>" -->
<!--Filename or Filesize can be specified as attribute or element tag -->
<!ELEMENT FILE (NAME?, SIZE?, TIME?, BLOCK*, OS?, BYTEORDER?, PASSWORD?,
CRC?, MD?, MDR?, MDC?, MDX?, SHA, SHA_REVERSE?, MD2?, MD2_REVERSE?, MD3?,
MD3_REVERSE?, MD4?, MD4_REVERSE?, MD5?, MD5_REVERSE?, COLLISION_NUMBER?,
FLOOR?, CEIL?)>
<!--File Name attribute N -->
<!ATTLIST File N CDATA #IMPLIED>
<!--File Size in Bytes attribute S -->
<!ATTLIST File S CDATA #IMPLIED>
<!--Element Name is the File Name -->
<!ELEMENT NAME (#PCDATA)>
<!--Element OS is the Operating System Type -->
<!ELEMENT OS (#PCDATA)>
<!--Element BYTEORDER is the BYTEORDER of the computer -->
<!ELEMENT BYTEORDER (#PCDATA)>
<!--Element Password of file -->
<!ELEMENT PASSWORD (#PCDATA)>
<!ELEMENT BLOCK (#PCDATA)>
<!ATTLIST BLOCK NUM CDATA #REQUIRED>
<!ATTLIST BLOCK LNG CDATA #REQUIRED>
<!--File Size Bytes element -->
<!ELEMENT SIZE (#PCDATA)>
<!--File Signature Time -->
<!ELEMENT TIME (#PCDATA)>
<!--ELEMENT MD: User Defined digest:
     attribute t = Message Digest type
     attribute l = Message Digest length-->
<!ELEMENT MD (#PCDATA)>
<!ATTLIST MD t CDATA #REQUIRED>
<!ATTLIST MD l CDATA #REQUIRED>
<!--ELEMENT MDR: User Defined digest of reversed input:
     attribute t = Message Digest type
     attribute l = Message Digest length -->
<!ELEMENT MDR (#PCDATA)>
<!ATTLIST MDR t CDATA #REQUIRED>
<!ATTLIST MDR l CDATA #REQUIRED>
<!--ELEMENT MDX: User Defined digest of input: -->
<!--Examples: "<MDX>SHA:160:54173139a00072fdfa3988f1b8cf0e4e9baf31ee</MDX>"
-->
<!ELEMENT MDX (#PCDATA)>
<!--ELEMENT MDC: Chopped sub hash of input
        A message digest is run on an input and then chopped.
        The message digest is chopped at n bytes.
        So a 20 byte SHA digest can be chopped for small input
        files to create variable length hashes.
        An example SHA "<SHA>54173139a00072fdfa3988f1b8cf0e4e9baf31ee</SHA>"
        would be chopped to 2 bytes with the markup
        "<MDC t="SHA" l="2">54</MDC>" -->
<!ELEMENT MDC (#PCDATA)>
<!ATTLIST MDC t CDATA #REQUIRED>
<!ATTLIST MDC l CDATA #REQUIRED>
<!--ELEMENT SHA: Secure hash Algorithm -->
<!ELEMENT SHA (#PCDATA)>
<!ELEMENT SHA_REVERSE (#PCDATA)>
<!--ELEMENT MDx: Message Digest Algorithm -->
<!ELEMENT MD2 (#PCDATA)>
<!ELEMENT MD2_REVERSE (#PCDATA)>
<!ELEMENT MD3 (#PCDATA)>
<!ELEMENT MD3_REVERSE (#PCDATA)>
<!ELEMENT MD4 (#PCDATA)>
<!ELEMENT MD4_REVERSE (#PCDATA)>
<!ELEMENT MD5 (#PCDATA)>
<!ELEMENT MD5_REVERSE (#PCDATA)>
<!--ELEMENT Collision Number:
A collision occurs when there is a message digest in which
two inputs produce the same output digest list
A collision number can be used to differentiate collisions.
The first Input that produces the digest is collision number one.
Successive collision increment the number by one.
The 12$^{th}$ collision sets the collision number to 12.
```

| Compress2.dtd |
|---|
| The markup would be "<collision_number>12</collision_number>"<br>--><br><!ELEMENT COLLISION_NUMBER (#PCDATA)><br><!ELEMENT FLOOR (NUM?, FACT?)><br><!ELEMENT CEIL (NUM?, FACT?)><br><!ELEMENT FACT (#PCDATA)><br><!ELEMENT SHAMODULUS (#PCDATA)><br><!ELEMENT MD5MODULUS (#PCDATA)><br><!ELEMENT MODULUS (#PCDATA)><br><!ATTLIST MODULUS n CDATA #IMPLIED><br><!ELEMENT HUNDREDMODULUS (#PCDATA)><br><!ELEMENT THOUSANDMODULUS (#PCDATA)><br><!ELEMENT MILLIONMODULUS (#PCDATA)><br><!ELEMENT BILLIONMODULUS (#PCDATA)><br><!ELEMENT DMOD (#PCDATA)><br><!ELEMENT MODULUSEXPONENT (#PCDATA)><br><!ELEMENT MODULUSMULTIPLE (#PCDATA)><br><!ELEMENT NUM (#PCDATA)><br><!ELEMENT CRC (#PCDATA)> |

EXAMPLES

This is a list of markup examples in the compress2.dtd format.

Example 1 palindrome.xml

Example 1 demonstrates a file named palindrome.txt from which the size which is 12 bytes followed by the SHA digest, SHA reverse digest Ripe160 digest and Ripe 160 reverse digest enclosed in tags. The and tag represents a message digest and the t attribute represents the type. The floor and ceiling are empty. The file is well formed and enclosed within the arch tag.

```
<?xml version="1.0" encoding="ascii"?>
<!DOCTYPE COMPRESS_ARCH SYSTEM "compress2.dtd">
<ARCH>
<FILE>
<NAME>palindrome.txt</NAME>
<SIZE>12</SIZE>
<md t="SHA">d2d2922f9c0bea8ac448a2c67741eca8bba4a271</md>
<md t="SHA_REVERSE">d2d2922f9c0bea8ac448a2c67741eca8bba4a271</md>
<md t="ripe160">b7bda536ef319629b87b1a564678907834bdabae</md>
<md t="ripe160_reverse">b7bda536ef319629b87b1a564678907834bdabae</md>
<md t="MD5">86e444818581edddef062ad4ddcd00dd</md>
<md t="MD4">ae93876f99f0013b969313ee5483c051</md>
<md t="MD2">141ecbaa14a70771003b4b6973522c14</md>
<FLOOR></FLOOR>
<CEIL></CEIL>
</FILE>
</ARCH>
```

Example 2

This is an xml example of the directory markup for an archive. Multiple files can exist within a directory and files can exist outside of a directory in separate markup.

```
<?xml version="1.0" encoding="ascii"?>
<!DOCTYPE COMPRESS_ARCH SYSTEM "compress2.dtd">
<ARCH>
<DIR n="D:\Programs\Perl\">
<FILE>
<NAME>D:\Programs\Perl\bigfloat.pl</NAME>
```

-continued

```
<SIZE>1149</SIZE>
<md t="SHA">fed8cf9db1ad882e89c8987c6dcd435e98d767b3</md>
<md t="SHA_REVERSE">33417958ea18546542dd51c4bd9986e5d5da9d74</md>
<md t="MD5">71101f56f3d42112c4a0780bcd5051a9</md>
<md t="MD4">7ba62b83cb30209158db3e97694b4863</md>
<md t="MD2">e5419e9a7124852e9fa9fa9004ceabbc</md>
<FLOOR></FLOOR>
<CEIL></CEIL>
</FILE>
</DIR>
<FILE>
<NAME>D:\Programs\Perl\compress.dtd</NAME>
<SIZE>363</SIZE>
<md t="SHA">42e7e84866aadf4ce03f0d962fff62ee658791bb</md>
<md t="SHA_REVERSE">5c0e8287cfca132b0a84063f8d7cc5c61ed4589a</md>
<md t="MD5">730faf167f1b3c36e47ae1ec0cb74e19</md>
<md t="MD4">426018e86d668ecffc0874c6f63c9ed2</md>
<md t="MD2">bfef9fdb02d3f509bf82710ca0fa233a</md>
<FLOOR></FLOOR>
<CEIL></CEIL>
</FILE>
</ARCH>
```

Example 3

Example represents the use of the collision number

```
<?xml version="1.0" encoding="ascii"?>
<!DOCTYPE COMPRESS_ARCH SYSTEM "compress2.dtd">
<ARCH name="">
<FILE>
<NAME>out</NAME>
<SIZE>3961651</SIZE>
<SHA>54173139a00072fdfa3988f1b8cf0e4e9baf31ee</SHA>
<SHA_REVERSE>5563965239ce4ae6e66b23ed68afcdb83235577b</SHA_REVERSE>
<MD5>f11ef3dfe3815469a41d8ec29157d32c</MD5>
<MD4>e0f9a130b5ea1256d8c75126d26a6179</MD4>
<MD2>26080751c1200a69978fdad60f886f1f</MD2>
<FLOOR></FLOOR>
<CEIL></CEIL>
<COLLISION_NUMBER>12</COLLISION_NUMBER>
</FILE>
</ARCH>
```

Example 4

This example illustrates a file bytes converted to a big integer number modulus 1 million enclosed in the million-modulus tag. There is also a floor and ceiling number.

```
<?xml version="1.0" encoding="ascii"?>
<!DOCTYPE COMPRESS_ARCH SYSTEM "compress2.dtd">
<ARCH>
<FILE>
<NAME>palindrome.txt</NAME>
<SIZE>12</SIZE>
<mdt="SHA">d2d2922f9c0bea8ac448a2c67741eca8bba4a271</md>
<mdr t="SHA">d2d2922f9c0bea8ac448a2c67741eca8bba4a271</mdr>
<md t="RIPE160">b7bda536ef319629b87b1a564678907834bdabae</md>
<mdr t="RIPE160">b7bda536ef319629b87b1a564678907834bdabae</mdr>
<md t="MD5">86e444818581edddef062ad4ddcd00dd</md>
<md t="MD4">ae93876f99f0013b969313ee5483c051</md>
<md t="MD2">141ecbaa14a70771003b4b6973522c14</md>
<MILLIONMODULUS>+98097</MILLIONMODULUS>
<FLOOR>+54</FLOOR>
<CEIL>+55</CEIL>
</FILE>
</ARCH>
```

Example 5

This example illustrates a chopped digest tag mdc where only 1 or 2 or 3 bytes of the digest for sha and ripe160 or md2 are used. The number of bytes used in expressed in the l attribute.

```
<?xml version="1.0" encoding="ascii"?>
<!DOCTYPE COMPRESS_ARCH SYSTEM "compress2.dtd">
<ARCH>
<FILE>
<NAME>palindrome.txt</NAME>
<SIZE>12</SIZE>
<mdc t="SHA" l="1">d2</md>
<mdc t="RIPE160" l="3">b7bda5</md>
<mdc t="MD2" l="2">141e</md>
<MILLIONMODULUS>+98097</MILLIONMODULUS>
<FLOOR>+54</FLOOR>
<CEIL>+55</CEIL>
</FILE>
</ARCH>
```

Example 6

This example illustrates the use of the file blocks for the file out. The file was divided into two different blocks 2,000,000 and 1,961,651 bytes long and the bytes would then be passed through a digest SHA and SHA Reverse. The digest values are simple demonstrated uncalculated values.

```
<?xml version="1.0" encoding="ascii"?>
<!DOCTYPE COMPRESS_ARCH SYSTEM "compress2.dtd">
<ARCH>
<FILE>
<NAME>out</NAME>
<SIZE>3961651</SIZE>
<SHA>54173139a00072fdfa3988f1b8cf0e4e9baf31ee</SHA>
<SHA_REVERSE>5563965239ce4ae6e66b23ed68afcdb83235577b</SHA_REVERSE>
<MD5>f11ef3dfe3815469a41d8ec29157d32c</MD5>
<MD4>e0f9a130b5ea1256d8c75126d26a6179</MD4>
<MD2>26080751c1200a69978fdad60f886f1f</MD2>
<FLOOR></FLOOR>
<CEIL></CEIL>
<BLOCK num="1" lng="2000000">
<SHA>11111100a00072fdfa3988f1b8cf0e4e9baf31ee</SHA>
<SHA_REVERSE>0000111123ce4ae6e66b23ed68afcdb83235577b</SHA_REVERSE>
</BLOCK>
<BLOCK num="2" lng="1961651">
<SHA>5c0e8287cfca132b0a84063f8d7cc5c61ed4589a</SHA>
<SHA_REVERSE>1232212133232232221123223232332323321111</SHA_REVERSE>
</BLOCK>
</FILE>
</ARCH>
```

While the present invention has been illustrated and described above regarding various embodiments, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Appendix Information

Appendix 1:

Appendix 1 contains: (a) two Windows Activeperl programs (sha4.pl and sha4b.pl); (b) the corresponding xml output (md.out and mdb.out) (the xml output includes three keys); (c) a Windows Activeperl program (sha4reverse.pl) that runs the reverse of a file through the sha and captures it with SHA_REVERSE markup; (d) corresponding output in mdreverse.out; and (e) a simple xml compress dtd as compress.dtd for integrity or validation.

There is also a key collision from the checksum it can be numbered to differentiate it from other numbers that it collided with. If two numbers share a hash a number key can be assigned to differentiate them. mdreverse.collision.out.txt has a collision number in the markup. This demonstrates one way of resolving collisions.

Appendix 2:

Appendix 2 file list:

zsha_stra.c, 6 pages
out.test.run.txt.txt, 2 pages
outb.txt, 3 pages
compress3.xml, 11 pages
compress4.xml, 12 pages
compress5.floor.xml, 1 page
compress.modulus5.xml, 1 page
compress.modulus5b.xml, 1 page
compress.palindromea.xml, 1 page
compress.palindromeb.xml, 1 page
compress.xml, 1 page
compress_modulus2.xml, 1 page
compress_modulus.xml, 1 page
palindrome.txt.xml, 1 page
sha6b.pl, 8 pages
Total pages in Appendix 2: 51

Appendix 2—File Descriptions

Zsha_stra.c—This is an illustrative iterator program modified in c to find bytes that correspond to an SHA digest value. Once the SHA digest is found the string is output but a file could also be created.

Out.test.run.txt.txt—This is an example iteration over a group of bytes and the hash value.

Outb.txt—This is a log of the iteration over a block of data until a SHA (Secure Hash Digest) is found. The iterator is similar to a car odometer where the digits flips another every 255 iterations.

compress3.xml—This is an xml file compress4.xml—This is a basic example of the directory and file structure of a hierarchical xml file generated by sha6b.pl. It illustrates the output of 6 different digests to uniquely identify a files data. The digests used are SHA, SHA Reverse, Ripe 160 and MD5, MD4, MD3 and MD2.

compress5.floor.xml—This is a basic example of the directory and file structure of a hierarchical xml file. This also demonstrates a simple floor. The floor is 841 and the ceiling is 842 which is the range of an expanded number within which the program will search for a block of bytes that hash to the same digests listed for the file.

compress.modulus5.xml—This is a markup of the digests of a file with a modulus tag.

compress.modulus5b.xml—This is another version of the file big integer divided by a modulus to form a remainder of 1310 that is output between the modulus tags. This example digest XML is generated by sha6b.pl. It has 7 different digests that are used to validate a file.

compress.palindromea.xml—This is a palindrome xml file where the data has the same hash backward or forward.

compress.xml—This is a basic xml markup generated by the sha6b.pl Perl script.

compress_modulus2.xml—This is another version of the xml output by the sha6b.pl of the modulus. Loading the file into a big integer creates the modulus of a file by using a specified value. A big integer is a non native type that can be thousands of digits long and allows for large numbers to be computed. This also demonstrates modulus scanning where a modulus number is added to a big integer plus the remainder and hashed until a matching value is found.

compress_modulus.xml—This xml file generated by the Perl script sha6b.pl demonstrates the output of a file signature package with modulus tags.

palindrome.txt.xml—This file demonstrates what happens if a file has the same digest for the reverse of the input as the forward input.

sha6b.pl—This file is the xml file signature generator. It generates xml digest packages from a directory or file tree on a computer. Additional information and tags can be added. In addition it is extensible and allows for hundreds of different digest combinations to be used in the xml output. The XML output is well formed. Each digest operation can be packaged in a function call and the command line parameters allow for different combinations of signatures and headers or DTDs to included or excluded. The uniqueness of a digest can be extremely precise.

Sha_stringcmp.c—This is the more up to date version of the sha_stringcmp.c It is basically a corrected version of zsha_stra.c Sha_strcmp_log.txt—This is the log output that demonstrates how using a digest can uniquely identify a block of data or a set of bytes in a file.

What is claimed is:

1. A system for data decompression comprising:
one or more data processors configured to receive a data entry comprising data identifying: first and second checksum algorithms wherein the first and second checksum algorithms are different, a first checksum value generated by applying the first checksum algorithm to a data block, and a second checksum value generated by applying the second checksum algorithm to the data block;
wherein the data entry is a compressed representation of the data block, and the one or more data processors are programmed to decompress the data entry to generate the initial data block by:
identifying one or more data blocks within a range of numbers as potentially being the initial data block by applying the first checksum algorithm to each data block within the range of numbers to generate a set of first checksum values,
wherein each first checksum value corresponds to one or more data blocks within the range of numbers; and
identifying one or more data blocks within the range of numbers as potentially being the initial data block by searching for data blocks with corresponding first checksum values that match the first checksum value of the initial data block.

2. The system of claim 1, wherein the one or more data processors are further programmed to generate the data block by:
applying the second checksum algorithm to each data block within the range of numbers to generate a set of second checksum values, wherein each second checksum value corresponds to one or more data blocks within the range of numbers; and
identifying one or more data blocks within the range of numbers as potentially being the initial data block by searching for data blocks with corresponding second checksum to that match the second checksum value of the initial data block.

3. The system of claim 2, wherein the one or more data processors are further programmed to generate the data block by:
identifying the matching results between the data blocks identified as potentially being the data block based on the first checksum value and the data blocks identified as potentially being the data block based on the second checksum value.

4. The system of claim 1, wherein the data entry further comprises data identifying an attribute of the data block.

5. The system of claim 4, wherein the attribute comprises at least one of the following: name, size, length, hash type, checksum type, digest type, padding, floor, ceiling, modulus, collision, directory, root, drive, path, date, time, modified date, permission, owner, and byte order.

6. The system of claim 1, wherein the data entry is written in a markup language.

7. The system of claim 6, wherein the markup language is one of either XML or SGML.

8. The system of claim 1, wherein the first checksum algorithm is applied to selected data blocks in the data blocks within the range of numbers through a linear scan or nonlinear scan.

9. The system of claim 8, wherein the nonlinear scan is one of: a skipping scan, a modulus scan, or an exponential scan.

10. The system of claim 1, wherein each candidate data block is assigned a unique collision number.

11. The system of claim 1, wherein the first or second checksum algorithm is at least one of: an MD2 algorithm, an MD4 algorithm, an MD5 algorithm, an SHA algorithm, a Cyclic Redundant Checksum algorithm, a Ripe algorithm, a CRC16 checksum algorithm, a CRC32 checksum algorithm, and a CRC64 checksum algorithm.

12. The system of claim 1, wherein the one or more checksum values is at least one of: a hashed value, a digest, and a checksum number.

13. A system for data compression comprising:
a computer-readable storage medium;
a data processor configured to receive a digital file, wherein the digital file comprises one or more data blocks;
the data processor programmed to:
apply a first checksum algorithm and a second checksum algorithm to one of the one or more data blocks to create a first checksum value and a second checksum value, wherein the first checksum algorithm is different than the second checksum algorithm; and
create a data entry comprising data identifying the first and second checksum algorithms and the first and second checksum values, wherein the data entry has lower data storage requirements than the data block and can be used to create a decompressed version of the data block; and
store the data entry in the computer-readable storage medium.

14. The system of claim 13, wherein the data entry further comprises data identifying an attribute of the data block.

15. The system of claim 14, wherein the attribute comprises at least one of the following: name, size, length, hash type, checksum type, digest type, padding, floor, ceiling, modulus, collision, directory, root, drive, path, date, time, modified date, permission, owner, and byte order.

16. The system of claim 13, wherein the first or second checksum algorithms is at least one of: an MD2 algorithm, an MD4 algorithm, an MD5 algorithm, an SHA algorithm, a Cyclic Redundant Checksum algorithm, a Ripe algorithm, a CRC16 checksum algorithm, a CRC32 checksum algorithm, and a CRC64 checksum algorithm.

17. The system of claim 1, wherein the one or more checksum values is at least one of: a hashed value, a digest, and a checksum number.

18. A computer implemented method for data decompression comprising:
storing, in a non-transitory computer readable storage medium, a data entry comprising data identifying: first and second checksum algorithms wherein the first and second checksum algorithms are different, a first checksum value generated by applying the first checksum algorithm to a data block, and a second checksum value generated by applying the second checksum algorithm to the data block;

wherein the data entry represents a compressed version of the data block;

applying, via a data processor, the first checksum algorithm to each data block within a range of numbers to generate a set of first checksum values, wherein each first checksum value corresponds to one or more data blocks within the range of numbers; and identifying, via the data processor, one or more data blocks as potentially being the data block by searching of for data blocks with corresponding first checksum values that match the first checksum value of the initial data block.

* * * * *